(12) United States Patent
Agarwal et al.

(10) Patent No.: US 11,366,773 B2
(45) Date of Patent: Jun. 21, 2022

(54) HIGH BANDWIDTH LINK LAYER FOR COHERENT MESSAGES

(71) Applicant: Intel Corporation, Santa Clara, CA (US)

(72) Inventors: Ishwar Agarwal, Portland, OR (US); Peeyush Purohit, Portland, OR (US); Nitish Paliwal, Hillsboro, OR (US); Archana Srinivasan, Newark, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/840,266

(22) Filed: Apr. 3, 2020

(65) Prior Publication Data

US 2020/0334179 A1 Oct. 22, 2020

Related U.S. Application Data

(63) Continuation of application No. 16/141,729, filed on Sep. 25, 2018, now Pat. No. 10,614,000.

(60) Provisional application No. 62/667,230, filed on May 4, 2018.

(51) Int. Cl.
*G06F 13/16* (2006.01)
*G06F 11/10* (2006.01)
*G06F 13/40* (2006.01)
*G06F 13/42* (2006.01)
*G06F 12/0877* (2016.01)
*G06F 12/0815* (2016.01)

(52) U.S. Cl.
CPC ...... *G06F 13/1668* (2013.01); *G06F 11/1004* (2013.01); *G06F 13/4086* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| 8,683,572 | B1 | 3/2014 | Mahalingaiah | |
|---|---|---|---|---|
| 2014/0115420 | A1* | 4/2014 | Willey | G06F 13/4282 714/758 |
| 2014/0372658 | A1* | 12/2014 | Safranek | G06F 13/4282 710/314 |
| 2016/0026596 | A1* | 1/2016 | Klein | G06F 13/4221 710/313 |

(Continued)

OTHER PUBLICATIONS

T. Kranich and M. Berekovic, "NoC Switch with Credit Based Guaranteed Service Support Qualified for GALS Systems," 2010 13th Euromicro Conference on Digital System Design: Architectures, Methods and Tools, Lille, 2010, pp. 53-59 (Year: 2010).*

*Primary Examiner* — Farley Abad
*Assistant Examiner* — Dayton Lewis-Taylor
(74) *Attorney, Agent, or Firm* — Alliance IP, LLC

(57) ABSTRACT

Systems, methods, and devices can include link layer logic that is to identify, by a link layer device, first data received from the memory in a first protocol format, identify, by the link layer device, second data received from the cache in a second protocol format, multiplex, by the link layer device, a portion of the first data and a portion of the second data to produce multiplexed data; and generate, by the link layer device, a flow control unit (flit) that includes the multiplexed data.

22 Claims, 18 Drawing Sheets

(56) References Cited

U.S. PATENT DOCUMENTS

2017/0171095 A1 6/2017 Prasadh et al.
2019/0004990 A1* 1/2019 Van Doren ......... G06F 13/4234

* cited by examiner

| Flit ID | Flit Type | Slot 0 | Slot 1 | Slot 2 | Slot 3 |
|---|---|---|---|---|---|
| 0 | Headered | DH0<br>DH1<br>DH2<br>DH3 | DC0_0 | DC0_1 | DC0_2 |
| 1 | All Data Flit | DC0_3 | DC1_0 | DC1_1 | DC1_2 |
| 2 | All Data Flit | DC1_3 | DC2_0 | DC2_1 | DC2_2 |
| 3 | All Data Flit | DC2_3 | DC3_0 | DC3_1 | DC3_2 |
| 4 | Headered | Other Txn Type | DC3_3 | Other Txn Type | Other Txn Type |

| Flit ID | Flit Type | Slot 0 | Slot 1 | Slot 2 | Slot 3 |
|---|---|---|---|---|---|
| 0 | Headered | DH0<br>DH1 | DC0_0 | DC0_1 | DC0_2 |
| 1 | All Data Flit | DC0_3 | DC1_0 | DC1_1 | DC1_2 |
| 2 | Headered | Other Txn Type | DC1_3 | Other Txn Type | Other Txn Type |

| Flit ID | Flit Type | Slot 0 | Slot 1 | Slot 2 | Slot 3 |
|---|---|---|---|---|---|
| 0 | Headered | Other Txn Type | Other Txn Type | DH0 / DH1 / DH2 / DH3 | DC0_0 |
| 1 | All Data Flit | DC0_1 | DC0_2 | DC0_3 | DC1_0 |
| 2 | All Data Flit | DC1_1 | DC1_2 | DC1_3 | DC2_0 |
| 3 | All Data Flit | DC2_1 | DC2_2 | DC2_3 | DC3_0 |
| 4 | Headered | Other Txn Type | DC3_1 | DC3_2 | DC3_3 |

| Flit ID | Flit Type | Slot 0 | Slot 1 | Slot 2 | Slot 3 |
|---|---|---|---|---|---|
| 0 | Headered | Other Txn Type | Other Txn Type | DH0 / DH1 | DC0_0 |
| 1 | All Data Flit | DC0_1 | DC0_2 | DC0_3 | DC1_0 |
| 2 | Headered | Other Txn Type | DC1_1 | DC1_2 | DC1_3 |

- 882
- 884
- 886

HIGH BANDWIDTH LINK LAYER FOR COHERENT MESSAGES

CROSS REFERENCE TO RELATED APPLICATION

This application is a continuation (and claims the benefit under 35 U.S.C. § 120) of U.S. application Ser. No. 16/141,729, filed on Sep. 25, 2018, which claims the benefit of U.S. Provisional Application No. 62/667,230, filed on May 4, 2018, the entire contents of which are incorporated by reference herein.

BACKGROUND

In computing, a cache is a component that stores data so future requests for that data can be served faster. For example, data stored in cache might be the result of an earlier computation, or the duplicate of data stored elsewhere. In general, a cache hit can occur when the requested data is found in cache, while a cache miss can occur when the requested data is not found in the cache. Cache hits are served by reading data from the cache, which typically is faster than recomputing a result or reading from a slower data store. Thus, an increase in efficiency can often be achieved by serving more requests from cache.

BRIEF DESCRIPTION OF THE DRAWINGS

FIG. 7A is a schematic diagram of an example flit format having a fixed width and a 16 bit cyclic redundancy check (CRC) in accordance with embodiments of the present disclosure.

FIG. 7B is a schematic diagram of an all-data flit in accordance with embodiments of the present disclosure.

FIGS. 8B-E illustrate example flit package scenarios in accordance with embodiments of the present disclosure.

DETAILED DESCRIPTION

Figure 1:
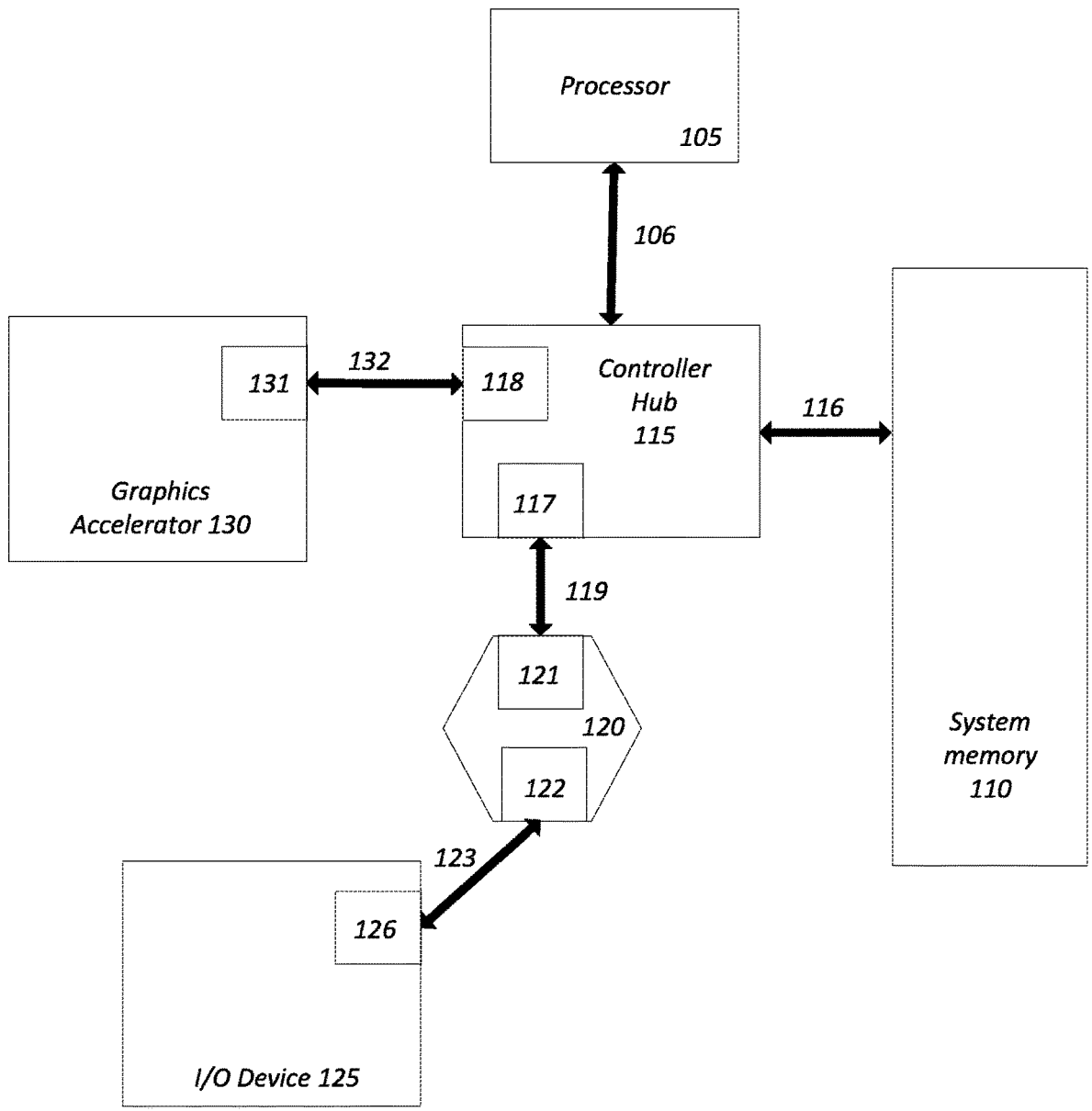
FIG. 1 is a schematic diagram of a simplified block diagram of a system including a serial point-to-point interconnect to connect I/O devices in a computer system in accordance with one embodiment.

In the following description, numerous specific details are set forth, such as examples of specific types of processors and system configurations, specific hardware structures, specific architectural and micro architectural details, specific register configurations, specific instruction types, specific system components, specific processor pipeline stages, specific interconnect layers, specific packet/transaction configurations, specific transaction names, specific protocol exchanges, specific link widths, specific implementations, and operation etc. in order to provide a thorough understanding of the present disclosure. It may be apparent, however, to one skilled in the art that these specific details need not necessarily be employed to practice the subject matter of the present disclosure. In other instances, well detailed description of known components or methods has been avoided, such as specific and alternative processor architectures, specific logic circuits/code for described algorithms, specific firmware code, low-level interconnect operation, specific logic configurations, specific manufacturing techniques and materials, specific compiler implementations, specific expression of algorithms in code, specific power down and gating techniques/logic and other specific operational details of computer system in order to avoid unnecessarily obscuring the present disclosure.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended examples and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the subject matter of the examples. However, the order of description should not be construed as to imply that these operations are necessarily order dependent. In particular, these operations may not be performed in the order of presentation. Operations described may be performed in a different order than the described embodiment.

Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Although the following embodiments may be described with reference to energy conservation, energy efficiency, processing efficiency, and so on in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from such features. For example, the disclosed embodiments are not limited to server computer system, desktop computer systems, laptops, Ultrabooks™, but may be also used in other devices, such as handheld devices, smartphones, tablets, other thin notebooks, systems on a chip (SOC) devices, and embedded applications. Some examples of handheld devices include cellular phones, Internet protocol devices, digital cameras, personal digital assistants (PDAs), and handheld PCs. Here, similar techniques for a high-performance interconnect may be applied to increase performance (or even save power) in a low power interconnect. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As may become readily apparent in the description below, the embodiments of methods, apparatus', and systems described herein (whether in reference to hardware, firmware, software, or a combination thereof) may be considered vital to a "green technology" future balanced with performance considerations.

As computing systems are advancing, the components therein are becoming more complex. The interconnect architecture to couple and communicate between the components has also increased in complexity to ensure bandwidth demand is met for optimal component operation. Furthermore, different market segments demand different aspects of interconnect architectures to suit the respective markets. For example, servers require higher performance, while the mobile ecosystem is sometimes able to sacrifice overall performance for power savings. Yet, it is a singular purpose of most fabrics to provide highest possible performance with maximum power saving. Further, a variety of different interconnects can potentially benefit from subject matter described herein.

The Peripheral Component Interconnect (PCI) Express (PCIe) interconnect fabric architecture and QuickPath Interconnect (QPI) fabric architecture, among other examples, can potentially be improved according to one or more principles described herein, among other examples. For instance, a primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express. Although the primary discussion herein is in reference to a new high-performance interconnect (HPI) architecture, aspects of the disclosure described herein may be applied to other interconnect architectures, such as a PCIe-compliant architecture, a QPI-compliant architecture, a MIPI compliant architecture, a high-performance architecture, or other known interconnect architecture.

Referring to FIG. 1, an embodiment of a fabric composed of point-to-point Links that interconnect a set of components is illustrated. System 100 includes processor 105 and system memory 110 coupled to controller hub 115. Processor 105 can include any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 can include a root hub, root complex, or root controller, such as in a PCIe interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, can include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a bridge (e.g., a PCIe to PCI/PCI-X bridge) to support legacy or other versions of devices or interconnect fabrics supported by such devices.

Graphics accelerator 130 can also be coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
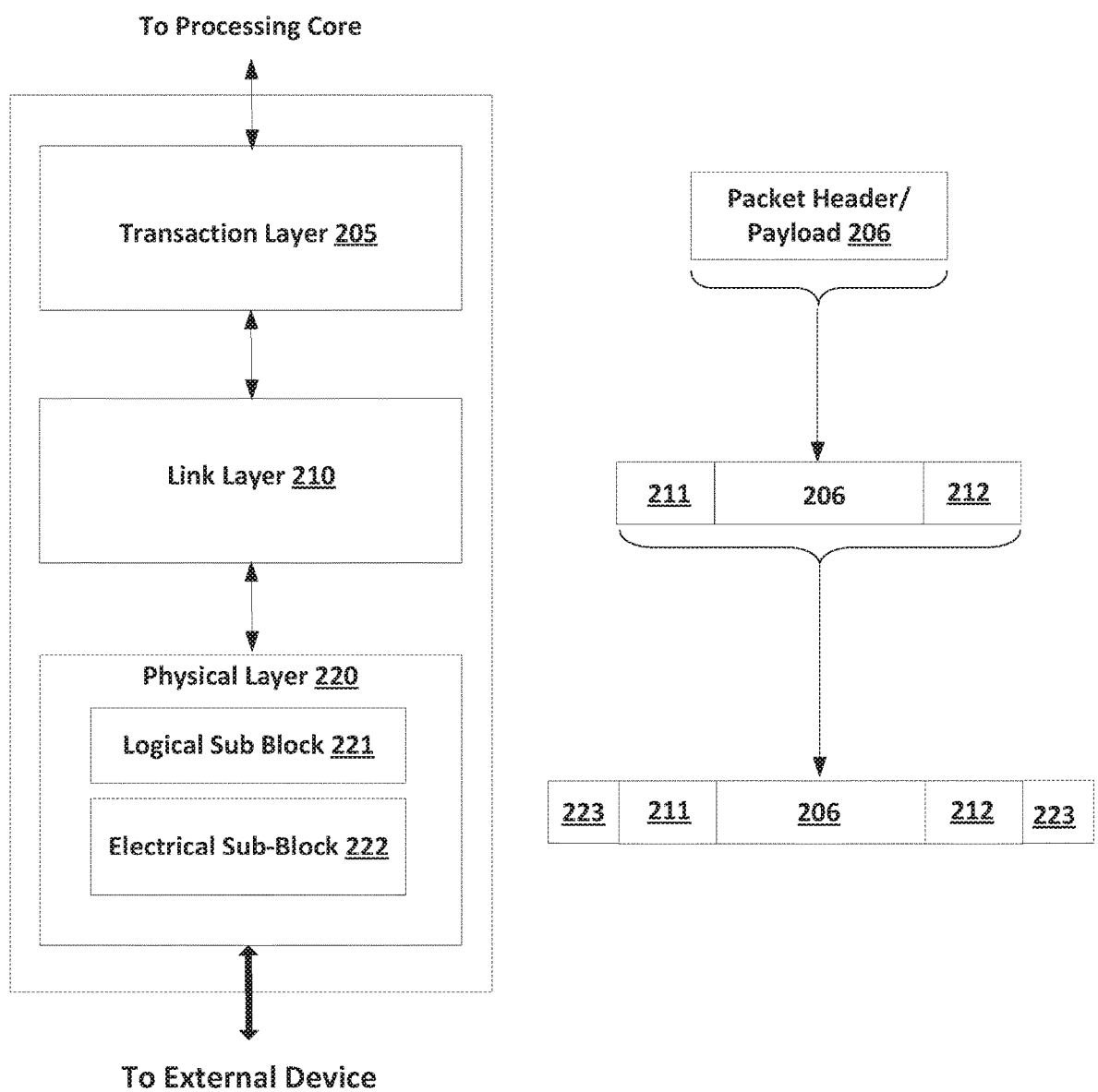
FIG. 2 is a schematic diagram of a simplified block diagram of a layered protocol stack in accordance with one embodiment.

Turning to FIG. 2 an embodiment of a layered protocol stack is illustrated. Layered protocol stack 200 can includes any form of a layered communication stack, such as a QPI stack, a PCIe stack, a next generation high performance computing interconnect (HPI) stack, or other layered stack. In one embodiment, protocol stack 200 can include transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

Packets can be used to communicate information between components. Packets can be formed in the Transaction Layer 205 and Data Link Layer 210 to carry the information from the transmitting component to the receiving component. As the transmitted packets flow through the other layers, they are extended with additional information used to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

In one embodiment, transaction layer 205 can provide an interface between a device's processing core and the interconnect architecture, such as Data Link Layer 210 and Physical Layer 220. In this regard, a primary responsibility of the transaction layer 205 can include the assembly and disassembly of packets (i.e., transaction layer packets, or TLPs). The translation layer 205 can also manage credit-based flow control for TLPs. In some implementations, split transactions can be utilized, i.e., transactions with request and response separated by time, allowing a link to carry other traffic while the target device gathers data for the response, among other examples.

Credit-based flow control can be used to realize virtual channels and networks utilizing the interconnect fabric. In one example, a device can advertise an initial amount of credits for each of the receive buffers in Transaction Layer 205. An external device at the opposite end of the link, such as controller hub 115 in FIG. 1, can count the number of credits consumed by each TLP. A transaction may be transmitted if the transaction does not exceed a credit limit. Upon receiving a response an amount of credit is restored. One example of an advantage of such a credit scheme is that the latency of credit return does not affect performance, provided that the credit limit is not encountered, among other potential advantages.

In one embodiment, four transaction address spaces can include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions can be used to access configuration space of various devices connected to the interconnect. Transactions to the configuration space can include read requests and write requests. Message space transactions (or, simply messages) can also be defined to support in-band communication between interconnect agents. Therefore, in one example embodiment, transaction layer 205 can assemble packet header/payload 206.

Examples of data link layer devices can include bridges, repeaters, switches, etc. A bridge can be similar to a repeater, with add on functionality of filtering content by reading the MAC addresses of source and destination. A bridge is also used for interconnecting two devices or systems or networks working on the same protocol, or in some embodiments, different protocols multiplexed into a single flit. A switch is a multi-port bridge with a buffer and a design that can boost its efficiency (large number of ports imply less traffic) and performance. Switch is data link layer device. Switch can perform error checking before forwarding data, that makes it very efficient as it does not forward packets that have errors and forward good packets selectively to correct port only. In other words, a switch divides collision domain of hosts, but broadcast domain remains same.

Figure 3:
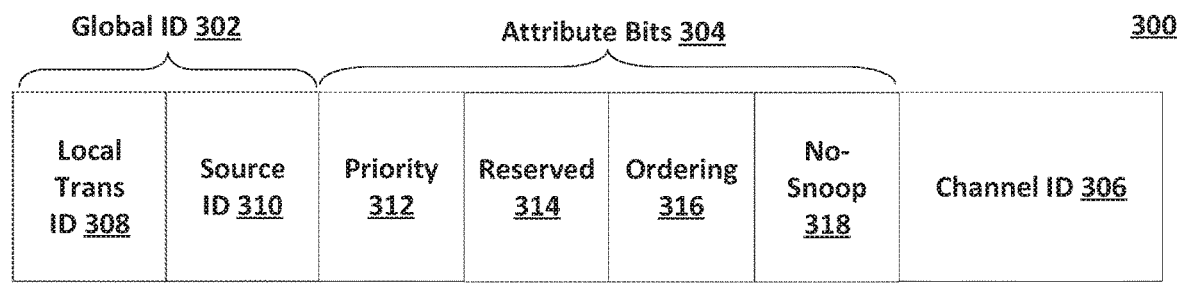
FIG. 3 is a schematic diagram of an embodiment of a transaction descriptor.

Quickly referring to FIG. 3, an example embodiment of a transaction layer packet descriptor is illustrated. In one embodiment, transaction descriptor 300 can be a mechanism for carrying transaction information. In this regard, transaction descriptor 300 supports identification of transactions in a system. Other potential uses include tracking modifications of default transaction ordering and association of transaction with channels. For instance, transaction descriptor 300 can include global identifier field 302, attributes field 304, and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and can be unique for all outstanding requests that require a completion for that requesting agent. Furthermore, in this example, source identifier 310 uniquely identifies the requestor agent within an interconnect hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Returning to the discussion of FIG. 2, a Link layer 210, also referred to as data link layer 210, can act as an intermediate stage between transaction layer 205 and the physical layer 220. In one embodiment, a responsibility of the data link layer 210 is providing a reliable mechanism for exchanging Transaction Layer Packets (TLPs) between two components on a link. One side of the Data Link Layer 210 accepts TLPs assembled by the Transaction Layer 205, applies packet sequence identifier 211, i.e., an identification number or packet number, calculates and applies an error detection code, i.e., CRC 212, and submits the modified TLPs to the Physical Layer 220 for transmission across a physical to an external device.

In one example, physical layer 220 includes logical sub block 221 and electrical sub-block 222 to physically transmit a packet to an external device. Here, logical sub-block 221 is responsible for the "digital" functions of Physical Layer 221. In this regard, the logical sub-block can include a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one example embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a protocol stack (such as a PCIe protocol stack), a layered protocol stack is not so limited. In fact, any layered protocol may be included/implemented and adopt features discussed herein. As an example, a port/interface that is represented as a layered protocol can include: (1) a first layer to assemble packets, i.e. a transaction layer; a second layer to sequence packets, i.e. a link layer; and a third layer to transmit the packets, i.e. a physical layer. As a specific example, a high performance interconnect layered protocol, as described herein, is utilized.

Figure 4:
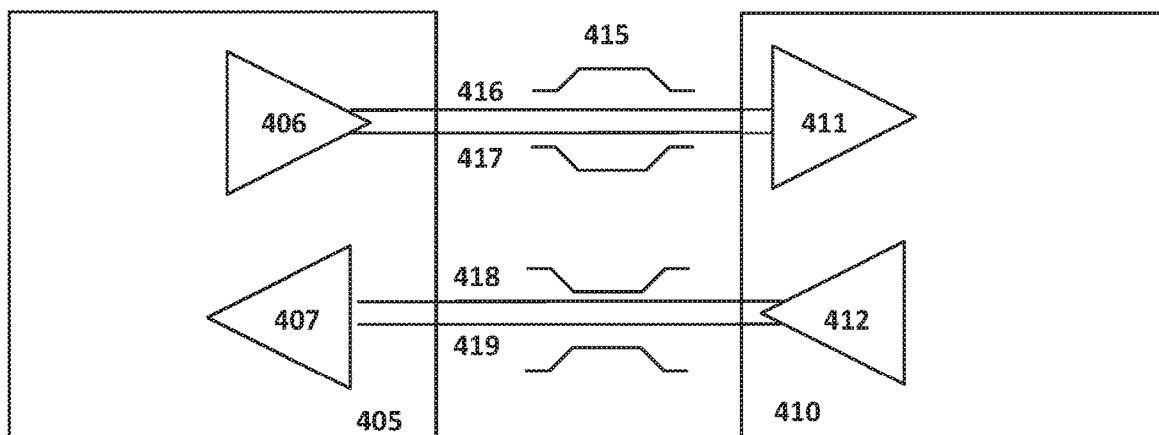
FIG. 4 is a schematic diagram of an embodiment of a serial point-to-point link.

Referring next to FIG. 4, an example embodiment of a serial point to point fabric is illustrated. A serial point-to-point link can include any transmission path for transmitting serial data. In the embodiment shown, a link can include two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in some implementations of a link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair can refer to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, among other example advantages. This allows for a better timing window, which enables faster transmission frequencies.

INTEL® accelerator Link (IAL) or other technologies (e.g. GenZ, CAPI) define a general purpose memory interface that allows memory associated with a discrete device, such as an accelerator, to serve as coherent memory. In many cases, the discrete device and associated memory may be a connected card or in a separate chassis from the core processor(s). The result of the introduction of device-associated coherent memory is that device memory is not tightly coupled with the CPU or platform. Platform specific firmware cannot be expected to be aware of the device details. For modularity and interoperability reasons, memory initialization responsibilities must be fairly divided between platform specific firmware and device specific firmware/software.

This disclosure describes an extension to the existing Intel Accelerator Link (IAL) architecture. IAL uses a combination of three separate protocols, known as IAL.io, IAL.cache, and IAL.mem to implement IAL's Bias Based Coherency model (hereinafter, Coherence Bias Model). The Coherence Bias Model can facilitate high performance in accelerators while minimizing coherence overhead.

IAL.io is a PCIe-compatible input/output (TO) protocol used by IAL for functionalities such as discovery, configuration, initialization, interrupts, error handling, address translation service, etc. IAL.io is non-coherent in nature, supports variable payload sizes and follows PCIe ordering rules. IAL.io is similar in functionality to Intel On-chip System Fabric (IOSF). IOSF is a PCIe protocol repackaged for multiplexing, used for discovery, register access, interrupts, etc.

IAL.mem is an I/O protocol used by the host to access data from a device attached memory. IAL.mem allows a device attached memory to be mapped to the system coherent address space. IAL.mem also has snoop and metadata semantics to manage coherency for device side caches. IAL.mem is similar to SMI3 that controls memory flows.

IAL.cache is an I/O protocol used by the device to request cacheable data from a host attached memory. IAL.cache is non-posted and unordered and supports cacheline granular payload sizes. IAL.cache is similar to the Intra Die Interconnect (IDI) protocol used for coherent requests and memory flows.

This disclosure uses IAL attached memory (IAL.mem protocol) as an example implementation, but can be extended to other technologies as well, such as those proliferated by the GenZ consortium or the CAPI or OpenCAPI specification, CCIX, NVLink, etc. The IAL builds on top of PCIe and adds support for coherent memory attachment. In general, however, the systems, devices, and programs described herein can use other types of input/output buses that facilitate the attachment of coherent memory.

Figure 5:
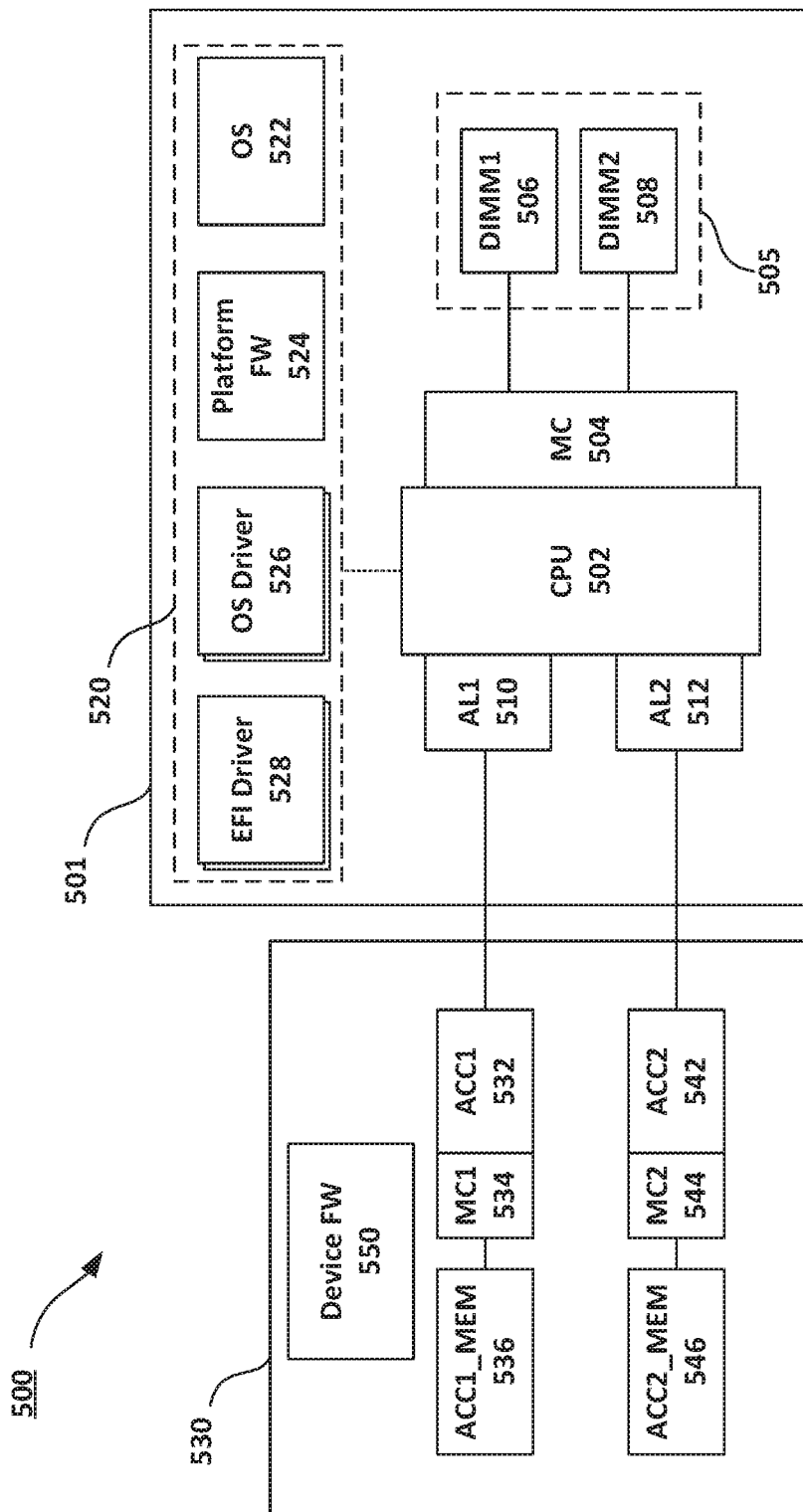
FIG. 5 is a schematic diagram of a processing system that includes a connected accelerator in accordance with embodiments of the present disclosure.

FIG. 5 is a schematic diagram of a processing system 500 that includes a connected accelerator in accordance with embodiments of the present disclosure. The processing system 500 can include a host device 501 and a connected device 530. The connected device 530 can be a discrete device connected across a IAL-based interconnect, or by another similar interconnect. The connected device 530 can be integrated within a same chassis as the host device 501 or can be housed in a separate chassis.

The host device 501 can include a processor core 502 (labelled as CPU 502). The processor core 502 can include one or more hardware processors. The processor core 502 can be coupled to memory module 505. The memory module 505 can include double data rate (DDR) interleaved memory, such as dual in-line memory modules DIMM1 506 and DIMM2 508, but can include more memory and/or other types of memory, as well. The host device 501 can include a memory controller 504 implemented in one or a combination of hardware, software, or firmware. The memory controller 504 can include logic circuitry to manage the flow of data going to and from the host device 501 and the memory module 505.

A connected device 530 can be coupled to the host device 501 across an interconnect. As an example, the connected device 530 can include accelerators ACC1 532 and ACC2 542. ACC1 532 can include a memory controller MC1 534 that can control a coherent memory ACC1_MEM 536. ACC2 542 can include a memory controller MC2 544 that can control a coherent memory ACC2_MEM 546. The connected device 530 can include further accelerators, memories, etc. ACC1_MEM 536 and ACC2_MEM 546 can be coherent memory that is used by the host processor; likewise, the memory module 505 can also be coherent memory. ACC1_MEM 536 and ACC2_MEM 546 can be or include host-managed device memory (HDM).

The host device 501 can include software modules 520 for performing one or more memory initialization procedures. The software modules 520 can include an operating system (OS) 522, platform firmware (FW) 524, one or more OS drivers 526, and one or more EFI drivers 528. The software modules 520 can include logic embodied on non-transitory machine readable media, and can include instructions that when executed cause the one or more software modules to initialize the coherent memory ACC1_MEM 536 and ACC2_MEM 546.

For example, platform firmware 524 can determine the size of coherent memory ACC1_MEM 536 and ACC2_MEM 546 and gross characteristics of memory early during boot-up via standard hardware registers or using Designated Vendor-Specific Extended Capability Register (DVSEC). Platform firmware 524 maps device memory ACC1_MEM 536 and ACC2_MEM 546 into coherent address spaces. Device firmware or software 550 performs device memory initialization and signals platform firmware 524 and/or system software 520 (e.g., OS 522). Device firmware 550 then communicates detailed memory characteristics to platform firmware 524 and/or system software 520 (e.g., OS 522) via software protocol.

Figure 6:
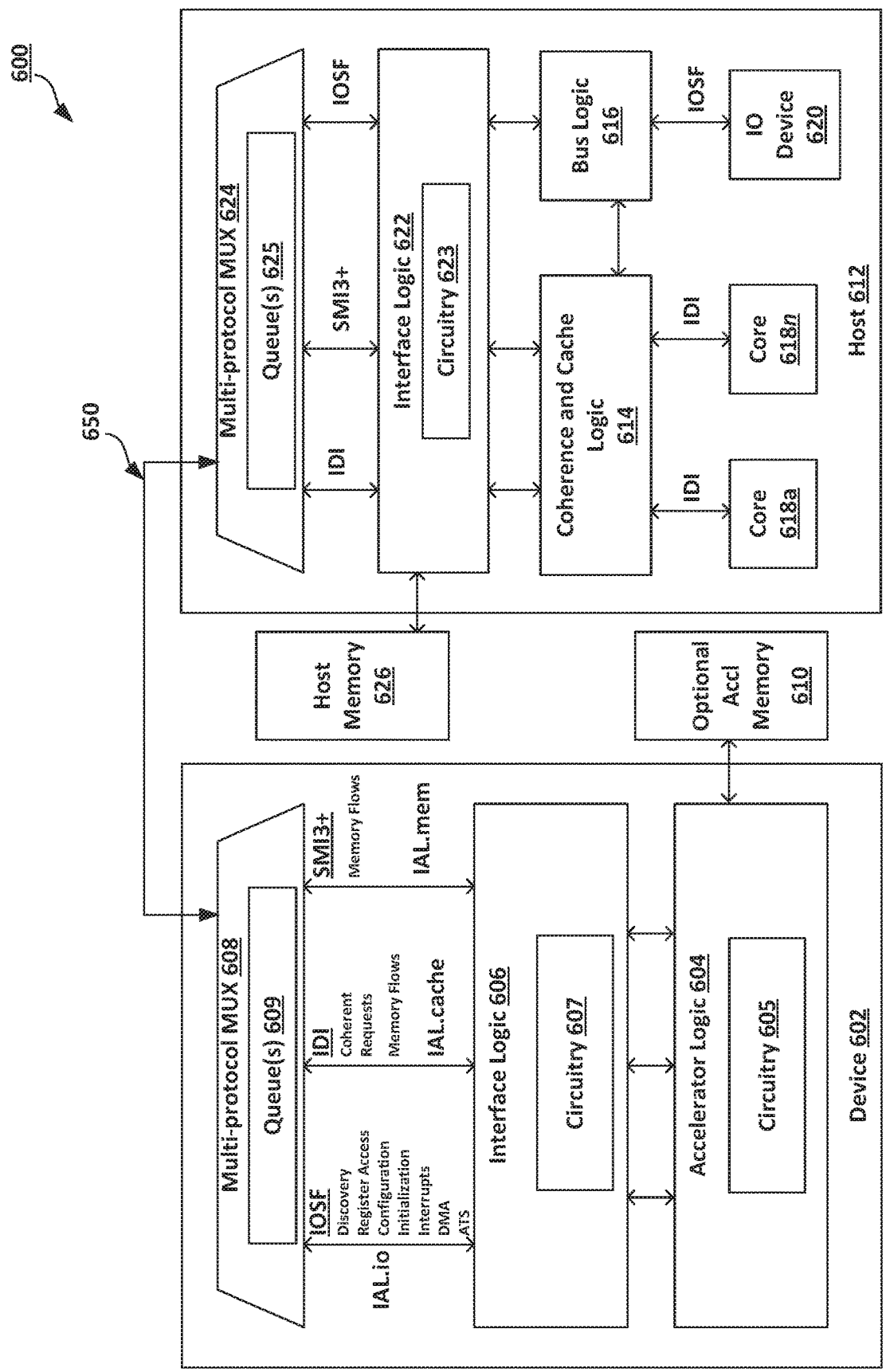
FIG. 6 is a schematic diagram of an example computing system in accordance with embodiments of the present disclosure.

FIG. 6 illustrates an example of an operating environment 600 that may be representative of various embodiments. The operating environment 600 depicted in FIG. 6 may include a device 602 operative to provide processing and/or memory capabilities. For example, device 602 may be, an accelerator or processor device communicatively coupled to a host 612 via an interconnect 650, which may be single interconnect, bus, trace, and so forth. The device 602 and host 612 may communicate over link 650 to enable data and message to pass there between. In some embodiments, link 650 may be operable to support multiple protocols and communication of data and messages via the multiple interconnect protocols. For example, the link 650 may support various interconnect protocols, including, without limitation, a non-coherent interconnect protocol, a coherent interconnect protocol, and a memory interconnects protocol. Non-limiting examples of supported interconnect protocols may include PCI, PCIe, USB, IDI, IOSF, SMI, SMI3, IAL.io, IAL.cache, and IAL.mem, and/or the like. For example, the link 650 may support a coherent interconnect protocol (for instance, IDI), a memory interconnect protocol (for instance, SMI3), and non-coherent interconnect protocol (for instance, IOSF).

In embodiments, the device 602 may include accelerator logic 604 including circuitry 605. In some instances, the accelerator logic 604 and circuitry 605 may provide processing and memory capabilities. In some instances, the accelerator logic 604 and circuitry 605 may provide additional processing capabilities in conjunction with the processing capabilities provided by host 612. Examples of device 602 may include producer-consumer devices, producer-consumer plus devices, software assisted device memory devices, autonomous device memory devices, and giant cache devices, as previously discussed. The accelerator logic 604 and circuitry 605 may provide the processing and memory capabilities based on the device. For example, the accelerator logic 604 and circuitry 605 may communicate using interconnects using, for example, a coherent interconnect protocol (for instance, IDI) for various functions, such as coherent requests and memory flows with host 612 via interface logic 606 and circuitry 607. The interface logic 606 and circuitry 607 may determine an interconnect protocol based on the messages and data for communication. In another example, the accelerator logic 604 and circuitry 605 may include coherence logic that includes or accesses bias mode information. The accelerator logic 604 including coherence logic may communicate the access bias mode information and related messages and data with host 612 using a memory interconnect protocol (for instance, SMI3) via the interface logic 606 and circuitry 607. The interface logic 606 and circuitry 607 may determine to utilize the memory interconnect protocol based on the data and messages for communication.

In addition, the interface logic 606, circuitry 607, or other portion of the device 602 can include a rollover counter to count a rollover value. The rollover value is a count, maintained by the link layers of the device 602 transmitter and receiver (i.e., TX and RX components of the interface logic 606 and circuitry 607). The rollover value is a count of discretized data amounts associated with a data transfer.

In some embodiments, the accelerator logic 604 and circuitry 605 may include and process instructions utilizing a non-coherent interconnect, such as a fabric-based protocol (for instance, IOSF) and/or a peripheral component interconnect express (PCIe) protocol. In various embodiments, a non-coherent interconnect protocol may be utilized for various functions, including, without limitation, discovery, register access (for instance, registers of device 602), configuration, initialization, interrupts, direct memory access, and/or address translation services (ATS). Note that the device 602 may include various accelerator logic 604 and circuitry 605 to process information and may be based on the type of device, e.g. producer-consumer devices, producer-consumer plus devices, software assisted device memory devices, autonomous device memory devices, and giant cache devices. Moreover and as previously discussed, depending on the type of device, device 602 including the interface logic 606, the circuitry 607, the protocol queue(s) 609 and multi-protocol multiplexer 608 may communicate in accordance with one or more protocols, e.g. non-coherent, coherent, and memory interconnect protocols. Embodiments are not limited in this manner.

In various embodiments, host 612 may be similar to processor 105, as discussed in FIG. 1, and include similar or the same circuitry to provide similar functionality. The host 612 may be operably coupled to host memory 626 and may include coherence logic (or coherence and cache logic) 614, which may include a cache hierarchy and have a lower level cache (LLC). Coherence logic 614 may communicate using various interconnects with interface logic 622 including circuitry 623 and one or more cores 618*a-n*. In some embodiments, the coherence logic 614 may enable communication via one or more of a coherent interconnect protocol, and a memory interconnect protocol. In some embodiments, the coherent LLC may include a combination of at least a portion of host memory 626 and accelerator memory 610. Embodiments are not limited in this manner.

Host 612 may include bus logic 616, which may be or may include PCIe logic. In various embodiments, bus logic 616 may communicate over interconnects using a non-coherent interconnect protocol (for instance, IOSF) and/or a peripheral component interconnect express (PCIe or PCI-E) protocol. In various embodiments, host 612 may include a plurality of cores 618*a-n*, each having a cache. In some embodiments, cores 618*a-n* may include Intel® Architecture (IA) cores. Each of cores 618*a-n* may communicate with coherence logic 614 via interconnects. In some embodiments, the interconnects coupled with the cores 618*a-n* and the coherence and cache logic 614 may support a coherent interconnect protocol (for instance, IDI). In various embodiments, the host processor may include a device 620 operable to communicate with bus logic 616 over an interconnect. In some embodiments, device 620 may include an I/O device, such as a PCIe I/O device.

In embodiments, the host 612 may include interface logic 622 and circuitry 623 to enable multi-protocol communication between the components of the host 612 and the device 602. The interface logic 622 and circuitry 623 may process and enable communication of messages and data between the host 612 and the device 602 in accordance with one or more interconnect protocols, e.g. a noncoherent interconnect protocol, a coherent interconnect, protocol, and a memory interconnect protocol, dynamically. In embodiments, the interface logic 622 and circuitry 623 may support a single interconnect, link, or bus capable of dynamically processing data and messages in accordance with the plurality of interconnect protocols.

In some embodiments, interface logic 622 may be coupled to a multi-protocol multiplexer 624 having one or more protocol queues 625 to send and receive messages and data with device 602 including multi-protocol multiplexer 608 and also having one or more protocol queues 609. Protocol queues 609 and 625 may be protocol specific. Thus, each interconnect protocol may be associated with a particular protocol queue. The interface logic 622 and circuitry 623 may process messages and data received from the device 602 and sent to the device 602 utilizing the multi-protocol multiplexer 624. For example, when sending a message, the interface logic 622 and circuitry 623 may process the message in accordance with one of interconnect protocols based on the message. The interface logic 622 and circuitry 623 may send the message to the multi-protocol multiplexer 624 and a link controller. The multi-protocol multiplexer 624 or arbitrator may store the message in a protocol queue 625, which may be protocol specific. The multi-protocol multiplexer 624 and link controller may determine when to send the message to the device 602 based on resource availability in protocol specific protocol queues of protocol queues 609 at the multi-protocol multiplexer 608 at device 602. When receiving a message, the multi-protocol multiplexer 624 may place the message in a protocol-specific queue of queues 625 based on the message. The interface logic 622 and circuitry 623 may process the message in accordance with one of the interconnect protocols.

In embodiments, the interface logic 622 and circuitry 623 may process the messages and data to and from device 602 dynamically. For example, the interface logic 622 and circuitry 623 may determine a message type for each message and determine which interconnect protocol of a plurality of interconnect protocols to process each of the messages. Different interconnect protocols may be utilized to process the messages.

In addition, the interface logic 622, circuitry 623, or other portion of the host 612 can include a rollover counter to count a rollover value. The rollover value is a count, maintained by the link layers of the device 612 transmitter and receiver (i.e., TX and RX components of the interface logic 622 and circuitry 623). The rollover value is a count of discretized data amounts associated with a data transfer.

In an example, the interface logic 622 may detect a message to communicate via the interconnect 650. In embodiments, the message may have been generated by a core 618 or another I/O device 620 and be for communication to a device 602. The interface logic 622 may determine a message type for the message, such as a non-coherent message type, a coherent message type, and a memory message type. In one specific example, the interface logic 622 may determine whether a message, e.g. a request, is an I/O request or a memory request for a coupled device based on a lookup in an address map. If an address associated with the message maps as an I/O request, the interface logic 622 may process the message utilizing a non-coherent interconnect protocol and send the message to a link controller and the multi-protocol multiplexer 624 as a non-coherent message for communication to the coupled device. The multi-protocol 624 may store the message in an interconnect specific queue of protocol queues 625 and cause the message to be sent to device 602 when resources are available at device 602. In another example, the interface logic 622 may determine an address associated with the message indicates the message is memory request based on a lookup in the address table. The interface logic 622 may process the message utilizing the memory interconnect protocol and send the message to the link controller and multi-protocol multiplexer 624 for communication to the coupled device 602. The multi-protocol multiplexer 624 may store the message an interconnect protocol-specific queue of protocol queues 625 and cause the message to be sent to device 602 when resources are available at device 602.

In another example, the interface logic 622 may determine a message is a coherent message based on one or more cache coherency and memory access actions performed. More specifically, the host 612 may receive a coherent message or request that is sourced by the coupled device 602. One or more of the cache coherency and memory access actions may be performed to process the message and based on these actions; the interface logic 622 may determine a message sent in response to the request may be a coherent message. The interface logic 622 may process the message in accordance with the coherent interconnect protocol and send the coherent message to the link controller and multi-protocol multiplexer 624 to send to the coupled device 602. The multi-protocol multiplexer 624 may store the message in an interconnect protocol-specific queue of queues 625 and cause the message to be sent to device 602 when resources are available at device 602. Embodiments are not limited in this manner.

In some embodiments, the interface logic 622 may determine a message type of a message based on an address associated with the message, an action caused by the message, information within the message, e.g. an identifier, a source of the message, a destination of a message, and so forth. The interface logic 622 may process received messages based on the determination and send the message to the appropriate component of host 612 for further processing. The interface logic 622 may process a message to be sent to device 602 based on the determination and send the message to a link controller (not shown) and multi-protocol multiplexer 624 for further processing. The message types may be determined for messages both sent and received from or by the host 612.

Current IAL architecture may use a combination of three separate protocols, known as IAL.io, IAL.cache and IAL.mem to implement IAL's Bias Based Coherency model (henceforth called the 'Coherence Bias Model'). The Coherence Bias Model may facilitate accelerators to achieve high performance while minimizing coherence overhead.

In embodiments, IAL architecture may support at least five types of accelerator models as defined below.

| Accelerator Class | Description | Examples |
|---|---|---|
| Producer-Consumer | Basic PCIe Devices | Network Accelerators Crypto Compression |

| Accelerator Class | Description | Examples |
|---|---|---|
| Producer-Consumer Plus | PCIe devices with additional capability Example: Special data operations such as atomics | Storm Lake Data Center Fabric Infiniband HBA |
| SW Assisted Device Memory | Accelerators with attached memory Usages where software "data placement" is practical | Discrete FPGA Graphics |
| Autonomous Device Memory | Accelerators with attached memory Usages where software "data placement" is not practical | Dense Computation Offload GPGPU |
| Giant Cache | Accelerators with attached memory Usages where data foot print is larger than attached memory | Dense Computation Offload GPGPU |

This disclosure describes systems, devices, and methods for high efficiency (e.g., >90%) link layers for cacheline sized (e.g., 64B) coherent data transfers. This efficiency maximizes achievable link bandwidth while maintaining low latency. Based on aspects of the present disclosure, IAL may achieve high efficiency and low latency due to one or more of the following 4 factors:

1. High flow control unit (flit) width: IAL flits may be sized to 528 bits, regardless of input/output (I/O) link width, thus amortizing the cost of cyclic redundancy checking (CRC) over a larger payload.

2. Sub-flit multiplexing of multiple protocols: The ability to mix and match messages from multiple protocols on the same flit dynamically may be employed.

3. All-data flit formats: The ability to send flits with no header may be employed.

4. Multi-Data Headers: The ability to chain together multiple unrelated data transfers may be employed, which amortizes header overhead for each transfer.

Link bandwidth is a performance index by which competing standards can be evaluated. I/O standards, such as Peripheral Component Interconnect Express (PCIe), may support payload sizes up to 4 kilobytes (KB), which helps the I/O standard achieve approximately 95% efficiency. However, payload sizes of coherent transports may be limited to much smaller cacheline granularity (64B). This may be a limiter on link efficiency and maximum achievable bandwidth. The techniques described herein may significantly reduce the gap between PCIe levels of link efficiency and coherent transports. High efficiency links, such as those described herein, can be used in bandwidth sensitive applications, such as direct memory access (DMA). In the following table, BW may refer to bandwidth and GT/s may refer to gigatransfers per second.

| Transfer Type | Link Efficiency | BW (32GT/s link) |
|---|---|---|
| IAL.$ Host to Device Data | 94% | 60.4 |
| IAL.$ Device to Host Data | 94% | 60.4 |
| IAL.Mem Slave to Master Data | 91% | 58.5 |
| IAL.Mem Master to Slave Data | 80% | 51.2 |

Fixed Flit Width with 16 Bit CRC

Figure 7A:
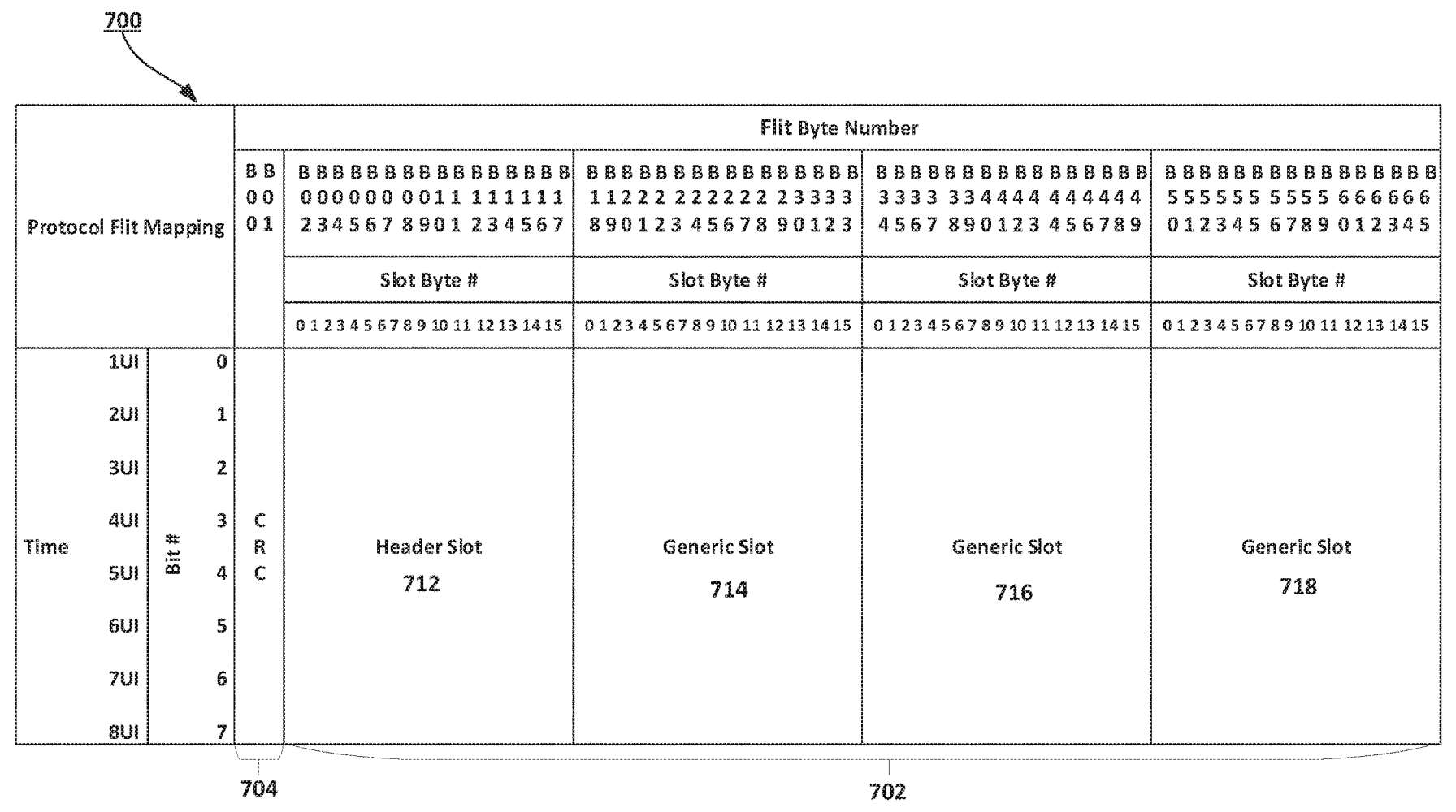

An example of the generic IAL.cache and IAL.mem flow control unit (flit) format is shown in FIG. 7A. FIG. 7A is a schematic diagram of an example flit format 700 having a fixed width and a 16 bit cyclic redundancy check (CRC) in accordance with embodiments of the present disclosure. In embodiments, IAL.cache and IAL.mem flit size may be fixed at 528 bits out of which 512 bits are payload 702 and 16 bits are a rolling cyclic redundancy check (CRC) 704. The flit size may not change regardless of physical link width or bifurcation. The fixed flit size with 16 bits of CRC amortizes the cost of CRC over a large payload without compromising on error detection or correction capability. All single, double, and triple bit errors and some 4 bit errors may be detected and can be corrected using replay.

Sub-Flit Multiplexing of Multiple Protocols

As can be seen from FIG. 7A, the flit may be divided into equal sized slots (e.g., header slot 712 and generic slots 714, 716, and 718). The header slot 712 may contain header information, including definition of protocol-level messages contained in the rest of the header slot, as well as the other slots in the flit. The IAL.cache and IAL.mem protocols may share a common link layer. Messages and data transfer from both protocols may be multiplexed into a shared flit in a dynamic packing format that allows low granular sharing of flit slots and at the same time, is flexible enough to allow a single active protocol to get full bandwidth. Since messages from the two protocols are packed into a sub-slot granularity, it may allow for maximum flit utilization.

Returning briefly to FIG. 6, the multi-protocol MUX 608 can be used to multiplex data and messages from both the IAL.cache and IAL.mem protocols (or in other embodiments, the IDI and SMI3+ protocols, or other similar protocols).

All-Data Flit Formats

Figure 7B:
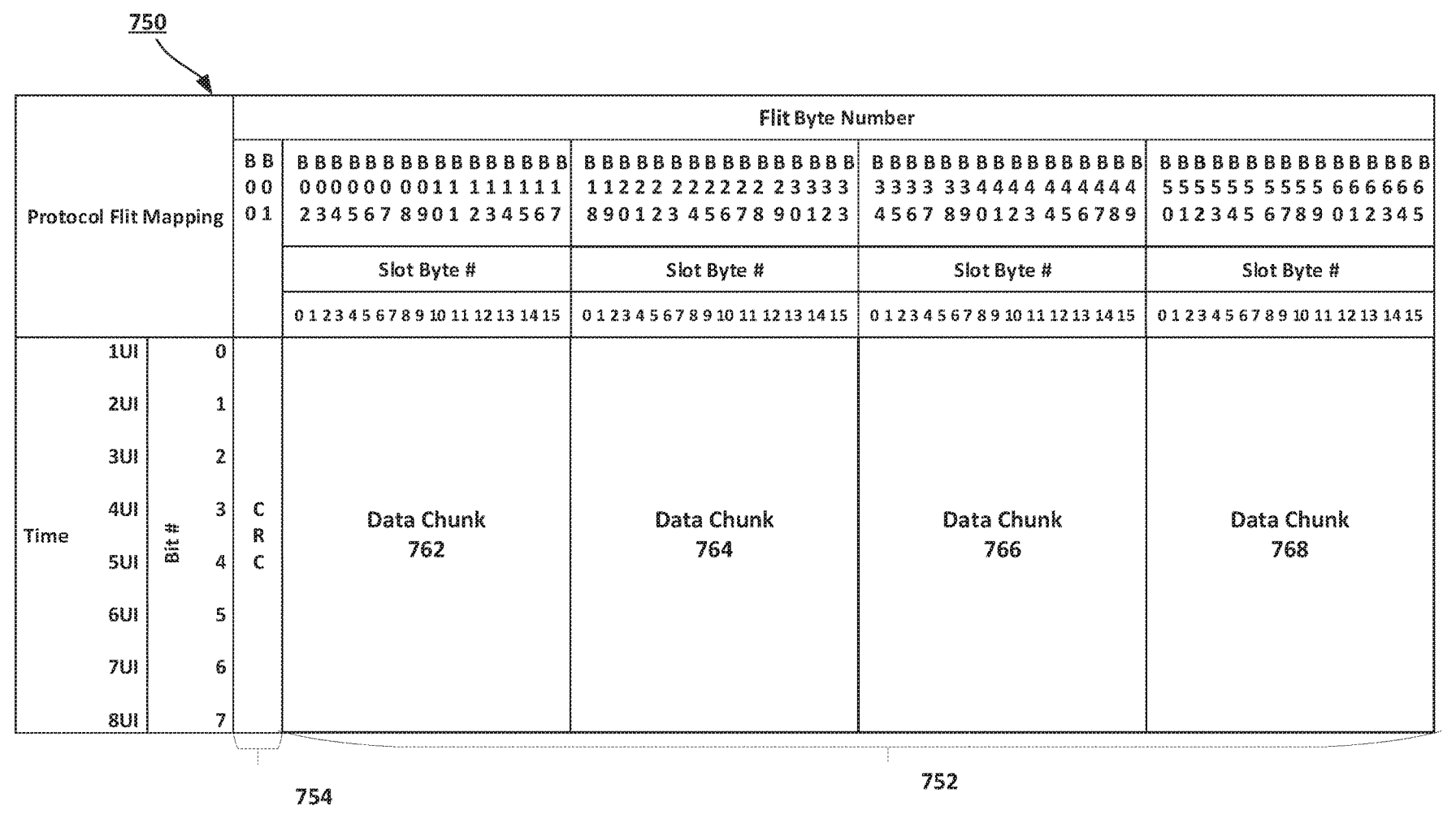

For high efficiency data transfers, IAL.cache and IAL.mem may utilize a flit format with no header slot as shown in FIG. 7B. FIG. 7B is a schematic diagram of an all-data flit 750 in accordance with embodiments of the present disclosure. Each slot 762, 764, 766, and 768 contains just data and does not carry any header and apart from CRC, the all-data flit 750 may maximize link utilization. However, since the receiver does not receive a header to decode the all-data flit 750, a tracking mechanism is described herein for this purpose. The tracking mechanism may be based on the concept of "rollover." A rollover is a count of data chunks associated with a given transfer that may be maintained by both the transmitter (Tx) and receiver (Rx) link layers. Whenever the Tx has 512b of data to send, as indicated by a rollover count, the Tx may send an all-data flit 750. Similarly, since the Rx keeps track of the messages it receives, the Rx may maintain a shadow of the Tx's rollover count. Using this count, it can deterministically know when to expect an all-data flit 750. The Tx and Rx components can be part of the interface hardware and software, such as the interface logic 606 and interface logic 622.

A receiver (Rx) will receive a flit with nothing but data (i.e., an all-data flit with no header information). The Rx has to have some information that helps the receiver understand what it is receiving. The RX maintains a rollover, which is a count maintained by both rx and tx of the number of data chucks associated with a given transfer. Whenever the Tx has 512b of data to send, as indicated by the Tx's rollover count, the Tx sends an all-data flit 750. Because of this rule, the Rx keeps track of messages it receives, e.g., by maintaining a shadow count of the Tx's rollover. The Rx can use to rollover to distinguish between a previous transfer that included a header and a subsequent transfer that is an all-data flit. This is how a Rx can decode an all-data flit without additional information. The rollover count changes dynamically as the data is transferred across the link between a Tx and the Rx.

During scenarios of Replay (due to CRC error, for example), a control flit may need to be disambiguated from an all-data flit. This may be done by creating sequences of control flits which the receiver can decode without any possibility of aliasing. For example, a sequence or series of control flits can be interpreted by the Rx as a replay scenario.

Multi-Data Header (MDH) Flits

Figure 8A:
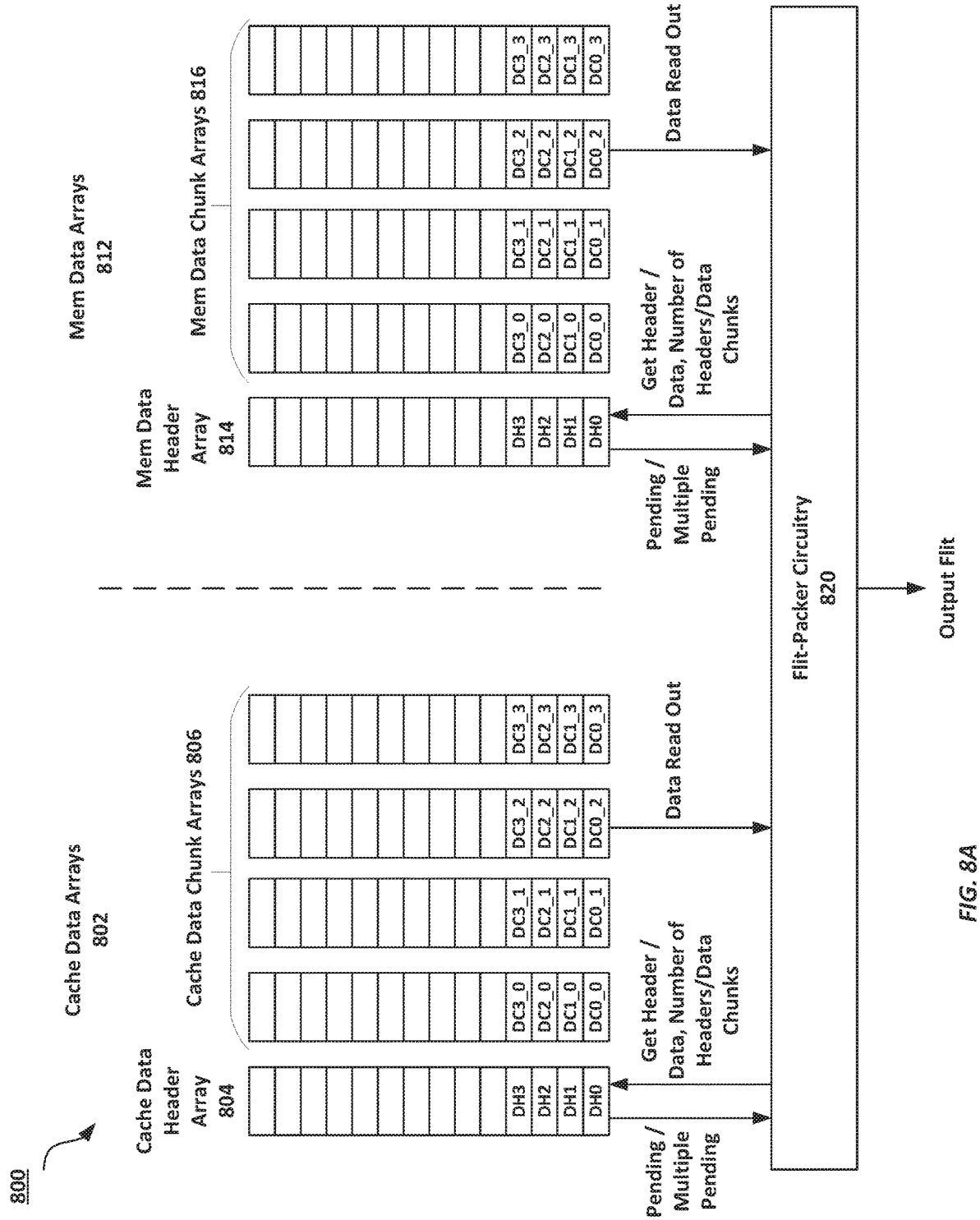
FIG. 8A is a schematic diagram of an example flit packing environment 800 in accordance with embodiments of the present disclosure.

FIG. 8A is a schematic diagram of an example flit packing environment 800 in accordance with embodiments of the present disclosure. In embodiments, the IAL.cache and IAL.mem link layer may have the ability to chain together multiple all-data flits. This may be useful for data streaming usages such as large DMA transfers. The concept here is that the data headers associated with multiple separate transfers can be tightly squeezed into a common header slot. After this, all subsequent slots and flits may contain nothing but the data associated with those headers. This may amortize the overhead of header information over a much larger payload. An example of this is diagrammatically shown below. Each "DH" represents a Data Header and each "DC" represents a 16 byte transfer associated with the header.

FIG. 8A illustrates set of cache data arrays 802 and mem data arrays 812. The cache data arrays 802 includes a cache data header array 804 and 4×16B cache data chunk arrays 806. The mem data arrays 812 includes a mem data header array 814 and 4×16B mem data chunk arrays 816. The cache data header array 804 and the mem data header array 814 each can accumulate data transactions information and can generate either a "Pending" or "Multiple Pending," message, depending on the number of full cache-lines worth of data present in them. The cache data header array 804 and the mem data header array 814 can send a Pending or Multiple Pending message to a flit packing decision logic 820. The flit packing decision logic 820 (or flit packer 820), can be implement in hardware, software, or a combination of hardware and software.

The flit packer 820 can optimize semantics that enable packing multiple data headers together. The flit packer 820 can translate from the received header information from the cache data header array 804 and mem data header array 814 to Multi Data Header (MDH) slot formats types defined to carry multiple data headers. An example of a MDH slot format is shown in Flit ID: 0 852 in FIG. 8B, which includes data headers (DH0, DH1, DH2, and DH3). The flit packer 820 can then package the cache and mem data chunks into free slots based on the arrangement of the headers within the header slot. In some cases, the flits are all-data flits. For example, Flit 0 852 is a headered flit in FIG. 8B that includes the MDH with headers DH0, DH1, DH2, and DH3 as well as DC0_0, DC0_1, and DC0_2. Flit 1 854*a* is an all-data flit that includes data content DC0_3, DC1_0, DC1_1, and DC1_2. More details about FIG. 8B are describe below.

Depending on the number of data headers packed, the flit packer must schedule 4×16B data chunk transfers associated with data headers while maintaining their order of precedence. The arrays are constructed in a way which allows for simultaneous access capabilities for up to 4 data headers, and individual controllability to read and steer each of the 4×16B data chunks.

Chained data transfers may result in one or more all-data flits that need to be sent over the link. Remote receiver must decode MDH slot format and maintain rollover counter to determine how many all-data flits would follow the flit containing data header information.

FIGS. 8B-E illustrate example flit package scenarios 850, 860, 870, and 880 in accordance with embodiments of the present disclosure. The examples shown in FIGS. 8B-E are example, and can be applied to cover number of data headers that can be packed together, along with their position (slot #) within the flit.

FIG. 8B illustrates a first example flit packaging scenario 850 in accordance with embodiments of the present disclosure. In this first example, a transmitter will package headers and chunks of data into flits that are chained together. The transmitter can use the flit packer 820 to package four data headers (DH0, DH1, DH2, and DH3) into a single slot of a headered flit (in this case, slot 0 of flit 0 852). Flit 0 852 is a headered flit in FIG. 8B that includes the MDH with headers DH0, DH1, DH2, and DH3 in slot 0 as well as DC0_0 in slot 1, DC0_1 in slot 2, and DC0_2 in slot 3. Flit 1 854a is an all-data flit that includes data content DC0_3, DC1_0, DC1_1, and DC1_2 in slots 0-3 respectively. Flit 2 854b and Flit 3 854c are also an all-data flits, similar to Flit 1 854a. Flit 4 856 is a headered flit that includes other Txn types in various slots, as well as the remainder of DC3 data (DC3_3) in slot 1.

FIG. 8C illustrates a second example flit packaging scenario 860 in accordance with embodiments of the present disclosure. In this second example, a transmitter will package headers and chunks of data into flits that are chained together. The transmitter can use the flit packer 820 to package two data headers (DH0 and DH1) into a single slot of a headered flit (in this case, slot 0 of flit 0 862). Flit 0 862 is a headered flit in FIG. 8C that includes the MDH with headers DH0 and DH1 in slot 0 as well as DC0_0 in slot 1, DC0_1 in slot 2, and DC0_2 in slot 3. Flit 1 864 is an all-data flit that includes data content DC0_3, DC1_0, DC1_1, and DC1_2 in slots 0-3 respectively. Flit 3 866 is a headered flit that includes other Txn types in various slots, as well as the remainder of DC1 data (DC1_3) in slot 1.

FIG. 8D illustrates a first example flit packaging scenario 870 in accordance with embodiments of the present disclosure. In this third example, a transmitter will package headers and chunks of data into flits that are chained together. The transmitter can use the flit packer 820 to package four data headers (DH0, DH1, DH2, and DH3) into a single slot of a headered flit (in this case, slot 2 of flit 0 872). Flit 0 852 is a headered flit in FIG. 8D that includes the MDH with headers DH0, DH1, DH2, and DH3 in slot 2 as well as DC0_0 in slot 3. Other Txn data can be in slots 0 and 1. Flit 1 874a is an all-data flit that includes data content DC0_1, DC0_2, DC0_3, and DC1_0 in slots 0-3 respectively. Flit 2 874b and Flit 3 874c are also an all-data flits, similar to Flit 1 874a. Flit 4 876 is a headered flit that includes other Txn types in slot 0, as well as DC3_1 in slot 1, DC3_2 in slot 2, and DC3_3 in slot 3.

FIG. 8E illustrates a second example flit packaging scenario 880 in accordance with embodiments of the present disclosure. In this second example, a transmitter will package headers and chunks of data into flits that are chained together. The transmitter can use the flit packer 820 to package two data headers (DH0 and DH1) into a single slot of a headered flit (in this case, slot 2 of flit 0 882). Flit 0 882 is a headered flit in FIG. 8E that includes the MDH with headers DH0 and DH1 in slot 2 as well as DC0_0 in slot 3. Other Txn data can be in slots 0 and 1. Flit 1 884 is an all-data flit that includes data content DC0_1, DC0_2, DC0_3, and DC1_0 in slots 0-3 respectively. Flit 3 886 is a headered flit that includes other Txn types in slot 0, as well as DC1_1 in slot 1, DC1_2 in slot 2, and DC1_3 in slot 3.

Figure 9A:
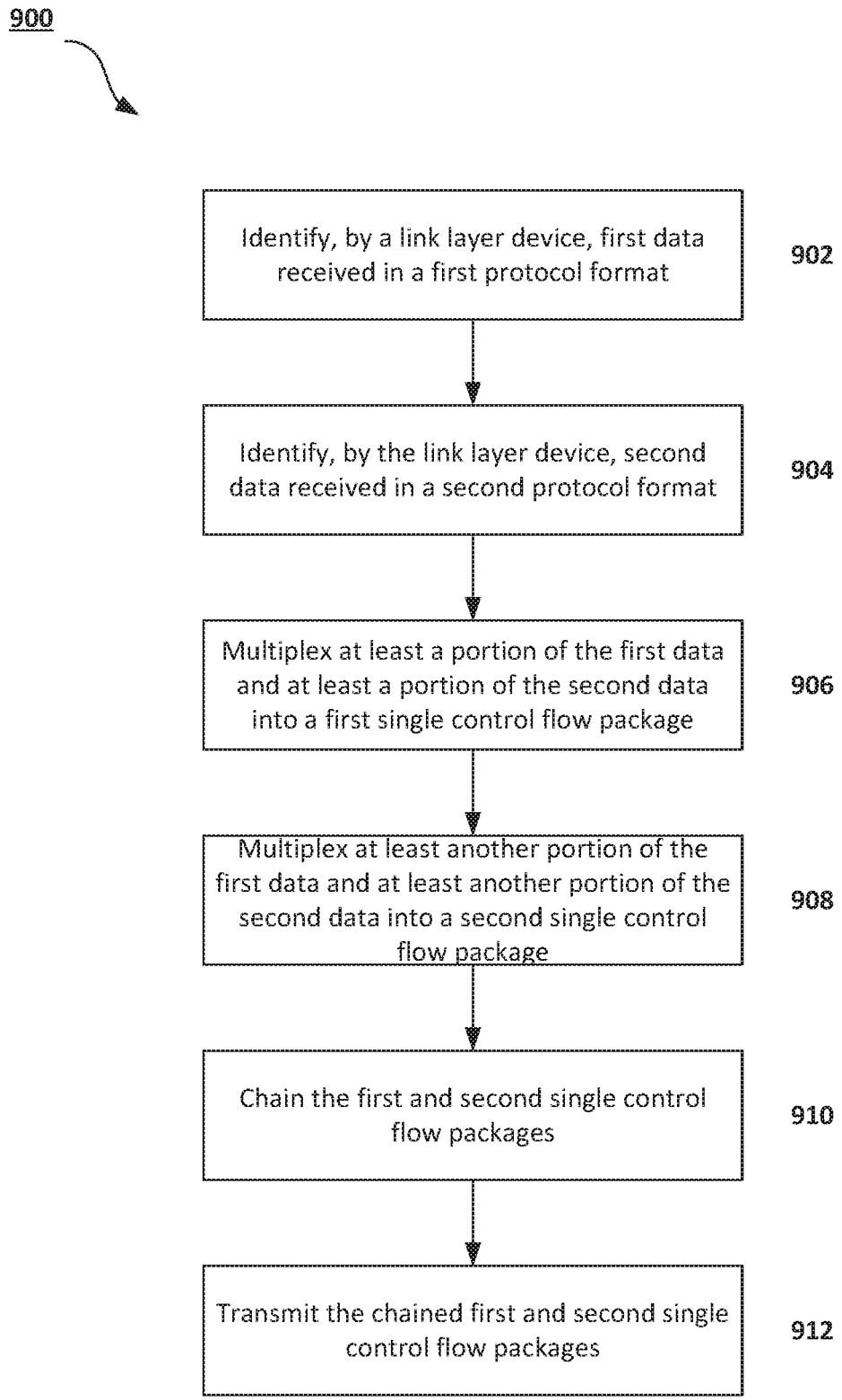
FIG. 9A is a process flow diagram for packing and decoding a chained flit that includes at least one all-data flit in accordance with embodiments of the present disclosure.

FIG. 9A is a process flow diagram 900 for packaging and decoding chained flits that include at least one all-data flit in accordance with embodiments of the present disclosure. A link layer device can identify first data received in a first protocol format (902). The link layer device can identify second data received in a second protocol format (904). At least a portion of the first data can be multiplexed with at least a portion of the second data into a first single control flow package (906). At least another portion of the first data can be multiplexed with at least another portion of the second data into a second single control flow package (908). The first and second single control flow packages can be chained (910). The chained first and second single control flow packages can be transmitted (912).

Figure 9B:
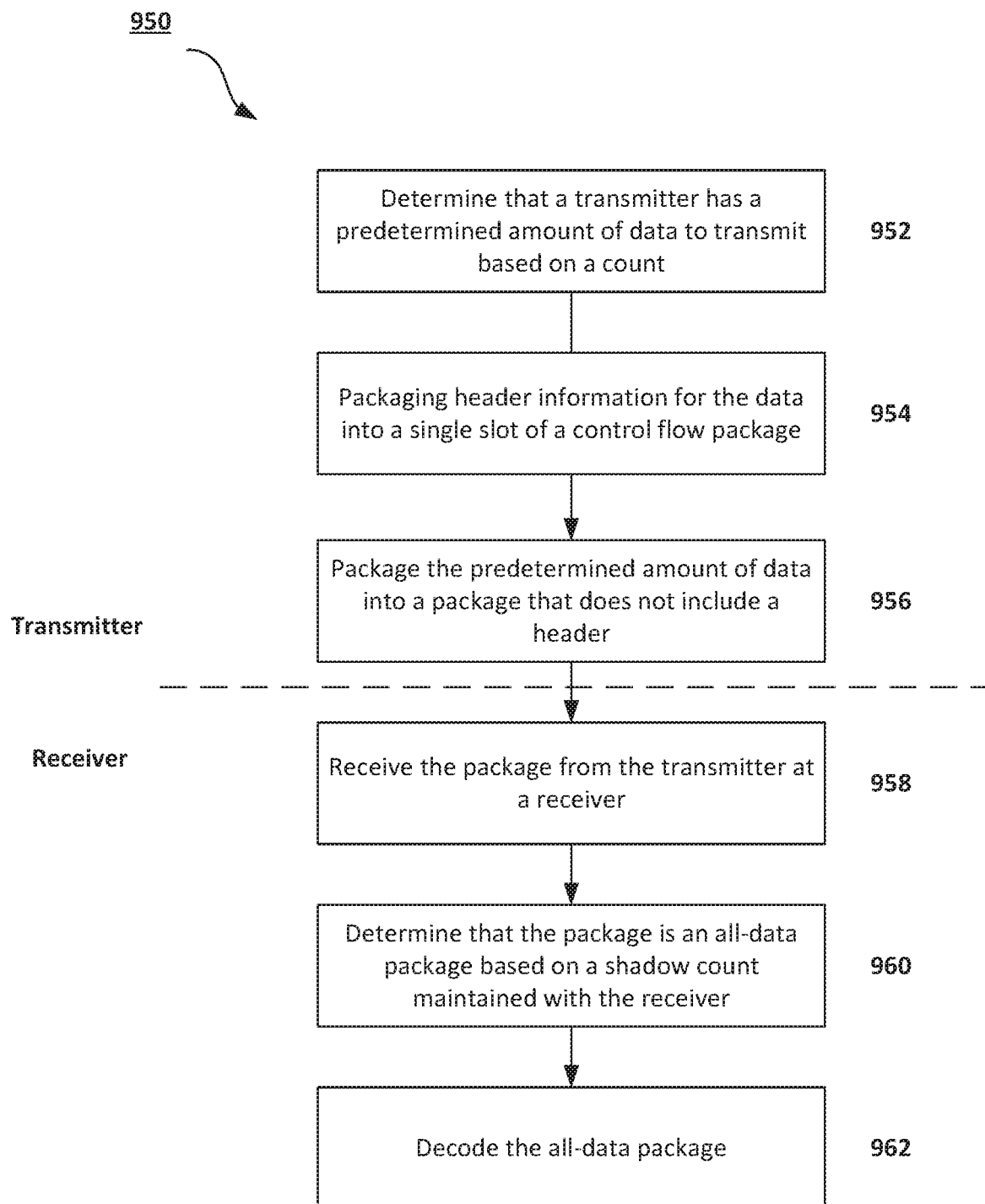
FIG. 9B is a process flow diagram for packaging and decoding an all-data package in accordance with embodiments of the present disclosure.

FIG. 9B is a process flow diagram 950 for packaging and decoding an all-data package in accordance with embodiments of the present disclosure. A transmitter element can determine that a transmitter has a predetermined amount of data to transmit based on a count (952). The transmitter element can package header information for the data into a single slot of a control flow package (954). The transmitter element can package the predetermined amount of data into a package that does not include a header an transmit the package to a receiver (956).

A receiver element can receive the package from the transmitter (958). The receiver element can determine that the package is an all-data package based on a shadow count maintained with the receiver (960). The receiver can decode the all-data package (962).

FIGS. 10A-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable for performing the methods described in this disclosure. In general, a huge variety of systems or electronic devices capable of incorporating a processor and/or other execution logic as disclosed herein are generally suitable.

Figure 10A:
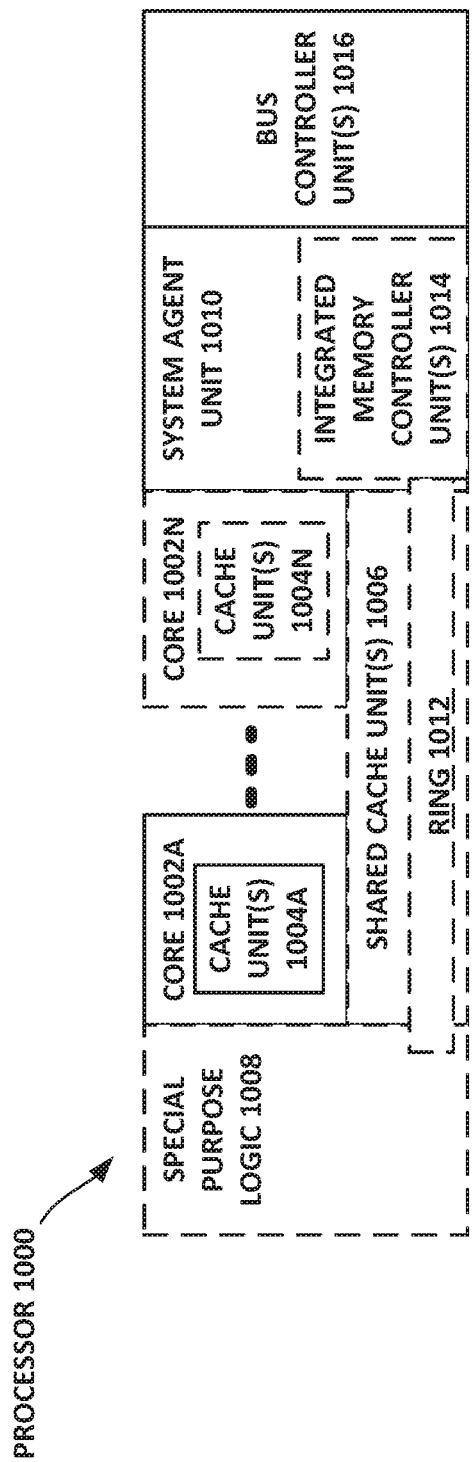
FIG. 10A is a block diagram of a processor that may have more than one core, may have an integrated memory controller, and may have integrated graphics according to various embodiments.

FIG. 10A is a block diagram of a processor 1000 that may have more than one core, may have an integrated memory controller, and may have integrated graphics according to various embodiments. The solid lined boxes in FIG. 10A illustrate a processor 1000 with a single core 1002A, a system agent 1010, and a set of one or more bus controller units 1016; while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, or a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression and/or decompression engine, graphics processor, GPGPU (general purpose graphics processing unit), a high-throughput many integrated core (MIC) coprocessor (e.g., including 30 or more cores), embedded processor, or other fixed or configurable logic that performs logical operations. The processor may be implemented on one or more chips. The processor 1000 may be a part of and/or may be implemented on one or more substrates using any of a number of process technologies, such as, for example, BiCMOS, CMOS, or NMOS.

In various embodiments, a processor may include any number of processing elements that may be symmetric or asymmetric. In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the special purpose logic (e.g., integrated graphics logic) 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the special purpose logic 1008. The display unit is for driving one or more externally connected displays.

The cores 1002A-N may be homogenous or heterogeneous in terms of architecture instruction set; that is, two or more of the cores 1002A-N may be capable of executing the same instruction set, while others may be capable of executing only a subset of that instruction set or a different instruction set.

Figure 10B:
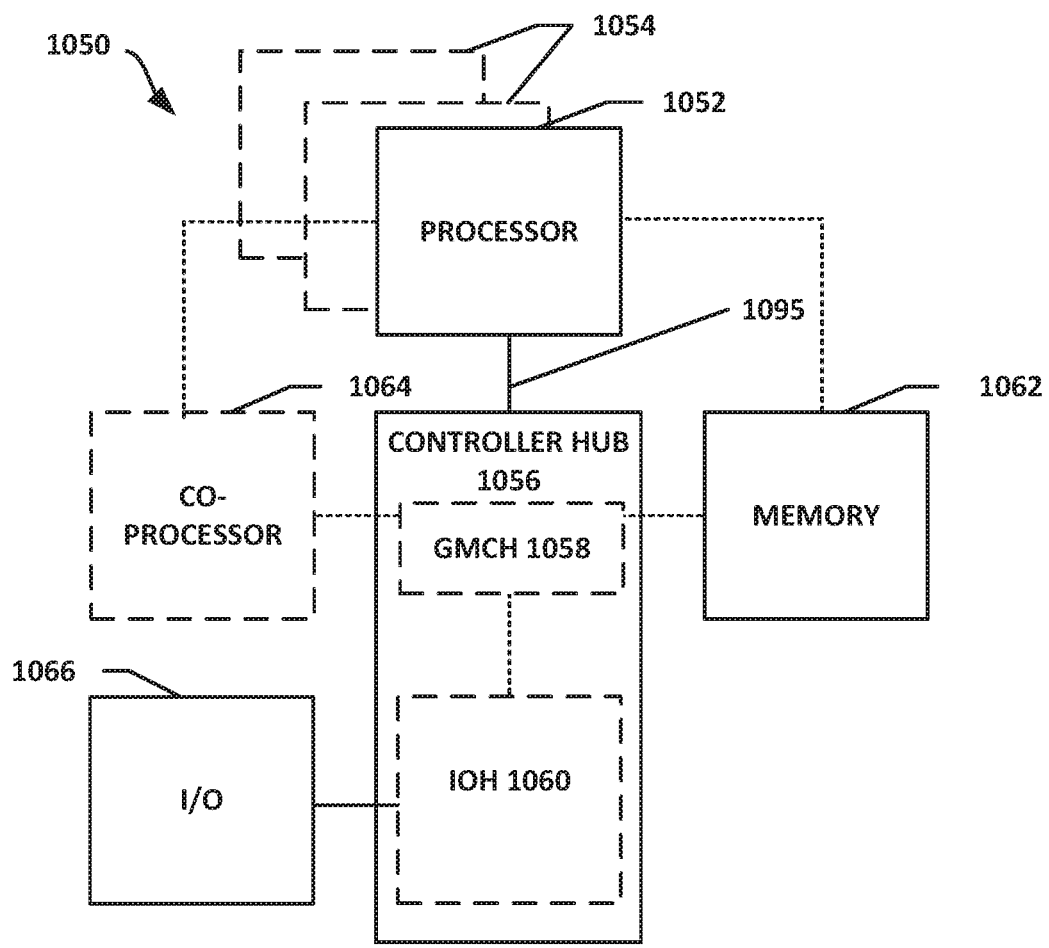
FIG. 10B depicts a block diagram of a system in accordance with one embodiment of the present disclosure.

FIG. 10B depicts a block diagram of a system 1050 in accordance with one embodiment of the present disclosure. The system 1050 may include one or more processors 1052, 1054, which are coupled to a controller hub 1056. In one embodiment the controller hub 1056 includes a graphics memory controller hub (GMCH) 1058 and an Input/Output Hub (IOH) 1060 (which may be on separate chips or the same chip); the GMCH 1058 includes memory and graphics controllers coupled to memory 1062 and a coprocessor 1064; the IOH 1060 couples input/output (I/O) devices 1066 to the GMCH 1058. Alternatively, one or both of the memory and graphics controllers are integrated within the processor (as described herein), the memory 1062 and the coprocessor 1064 are coupled directly to the processor 1052, and the controller hub 1020 is a single chip comprising the IOH 1060.

The optional nature of additional processors 1054 is denoted in FIG. 10B with broken lines. Each processor 1052, 1054 may include one or more of the processing cores described herein and may be some version of the processor 1000.

The memory 1062 may be, for example, dynamic random access memory (DRAM), phase change memory (PCM), other suitable memory, or any combination thereof. The memory 1062 may store any suitable data, such as data used by processors 1052, 1054 to provide the functionality of computer system 1050. For example, data associated with programs that are executed or files accessed by processors 1052, 1054 may be stored in memory 1062. In various embodiments, memory 1062 may store data and/or sequences of instructions that are used or executed by processors 1052, 1054.

In at least one embodiment, the controller hub 1056 communicates with the processor(s) 1052, 1054 via a multi-drop bus, such as a frontside bus (FSB), point-to-point interface such as QuickPath Interconnect (QPI), or similar connection 1095.

In one embodiment, the coprocessor 1064 is a special-purpose processor, such as, for example, a high-throughput MIC processor, a network or communication processor, compression and/or decompression engine, graphics processor, GPGPU, embedded processor, or the like. In one embodiment, controller hub 1056 may include an integrated graphics accelerator.

There can be a variety of differences between the physical resources 1052, 1054 in terms of a spectrum of metrics of merit including architectural, microarchitectural, thermal, power consumption characteristics, and the like.

In one embodiment, the processor 1052 executes instructions that control data processing operations of a general type. Embedded within the instructions may be coprocessor instructions. The processor 1052 recognizes these coprocessor instructions as being of a type that should be executed by the attached coprocessor 1064. Accordingly, the processor 1052 issues these coprocessor instructions (or control signals representing coprocessor instructions) on a coprocessor bus or other interconnect, to coprocessor 1064. Coprocessor(s) 1045 accept and execute the received coprocessor instructions.

Figure 11:
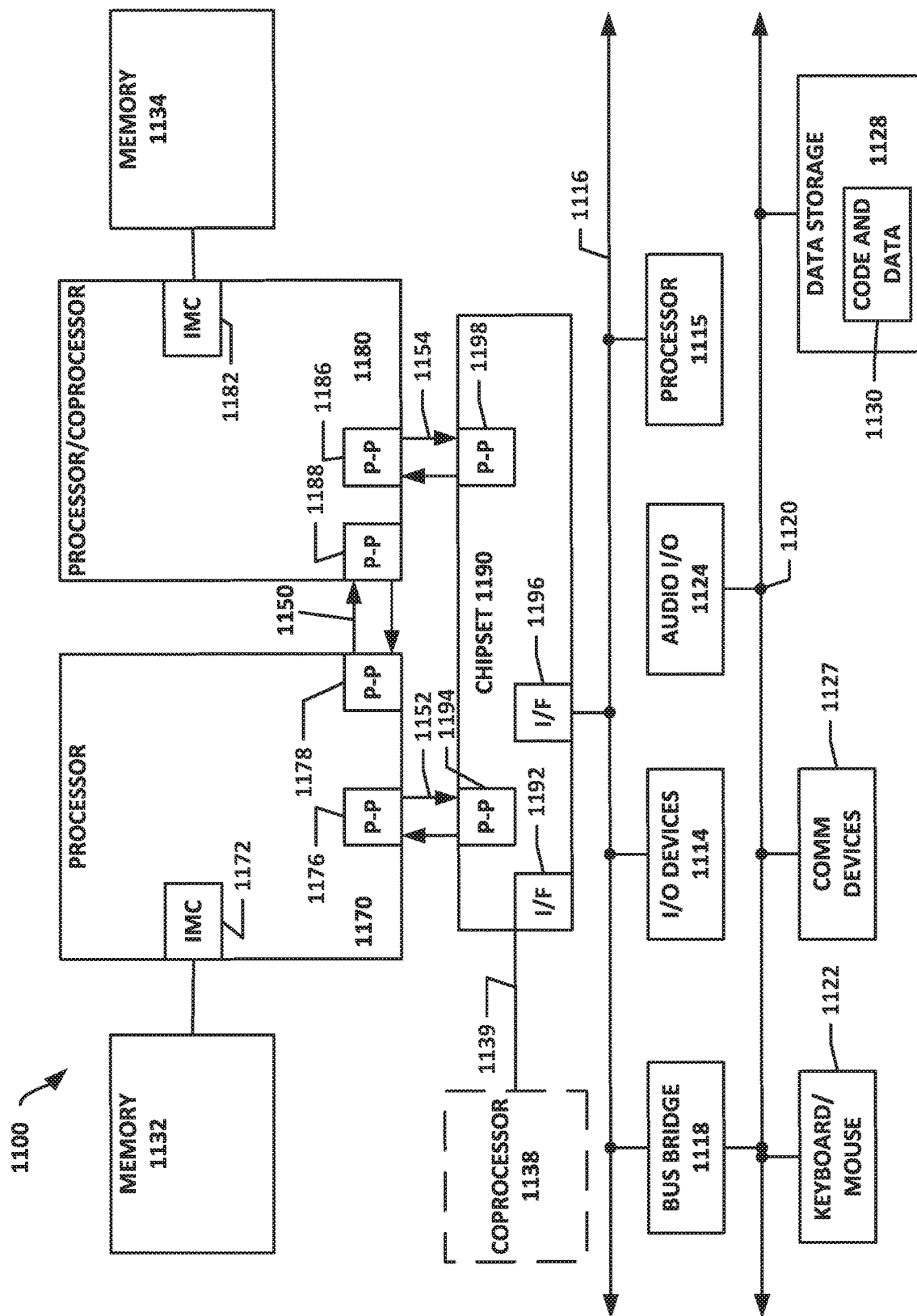
FIG. 11 depicts a block diagram of a first more specific exemplary system in accordance with an embodiment of the present disclosure.

FIG. 11 depicts a block diagram of a first more specific exemplary system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 1000. In one embodiment of the disclosure, processors 1170 and 1180 are respectively processors 1110 and 1115, while coprocessor 1138 is coprocessor 1145. In another embodiment, processors 1170 and 1180 are respectively processor 1110 and coprocessor 1145.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression and/or decompression engine, graphics processor, GPGPU, embedded processor, or the like.

A shared cache (not shown) may be included in either processor or outside of both processors, yet connected with the processors via a P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are contemplated by this disclosure. For example, instead of the point-to-point architecture of FIG. 11, a system may implement a multi-drop bus or other such architecture.

Figure 12:
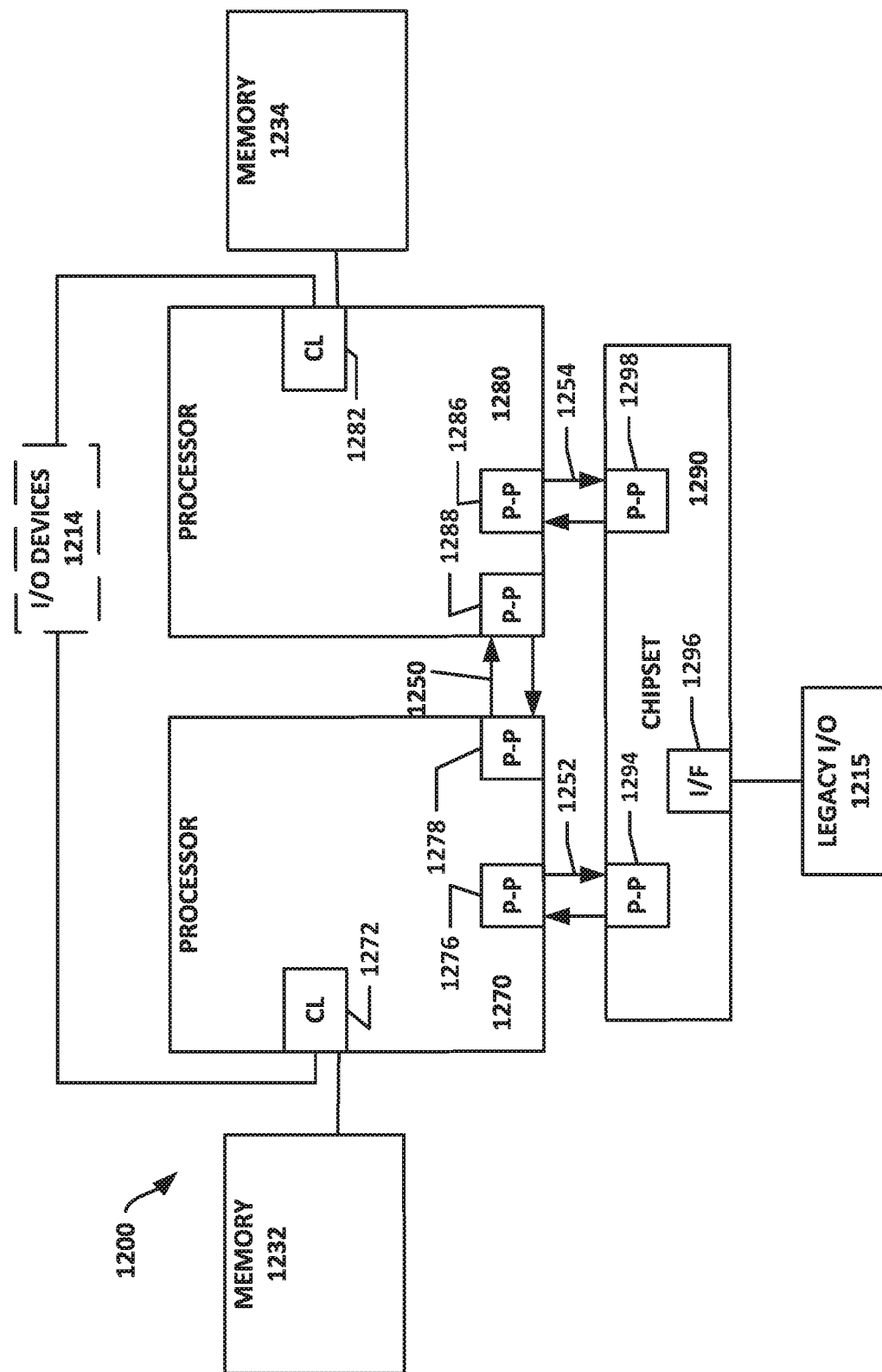
FIG. 12 depicts a block diagram of a second more specific exemplary system 1300 in accordance with an embodiment of the present disclosure.

FIG. 12 depicts a block diagram of a second more specific exemplary system 1200 in accordance with an embodiment of the present disclosure. Similar elements in FIGS. 11 and 12 bear similar reference numerals, and certain aspects of FIG. 11 have been omitted from FIG. 12 in order to avoid obscuring other aspects of FIG. 12.

FIG. 12 illustrates that the processors 1270, 1280 may include integrated memory and I/O control logic ("CL") 1272 and 1282, respectively. Thus, the CL 1272, 1282 include integrated memory controller units and include I/O control logic. FIG. 12 illustrates that not only are the memories 1232, 1234 coupled to the CL 1272, 1282, but also that I/O devices 1214 are also coupled to the control logic 1272, 1282. Legacy I/O devices 1215 are coupled to the chipset 1290.

Figure 13:
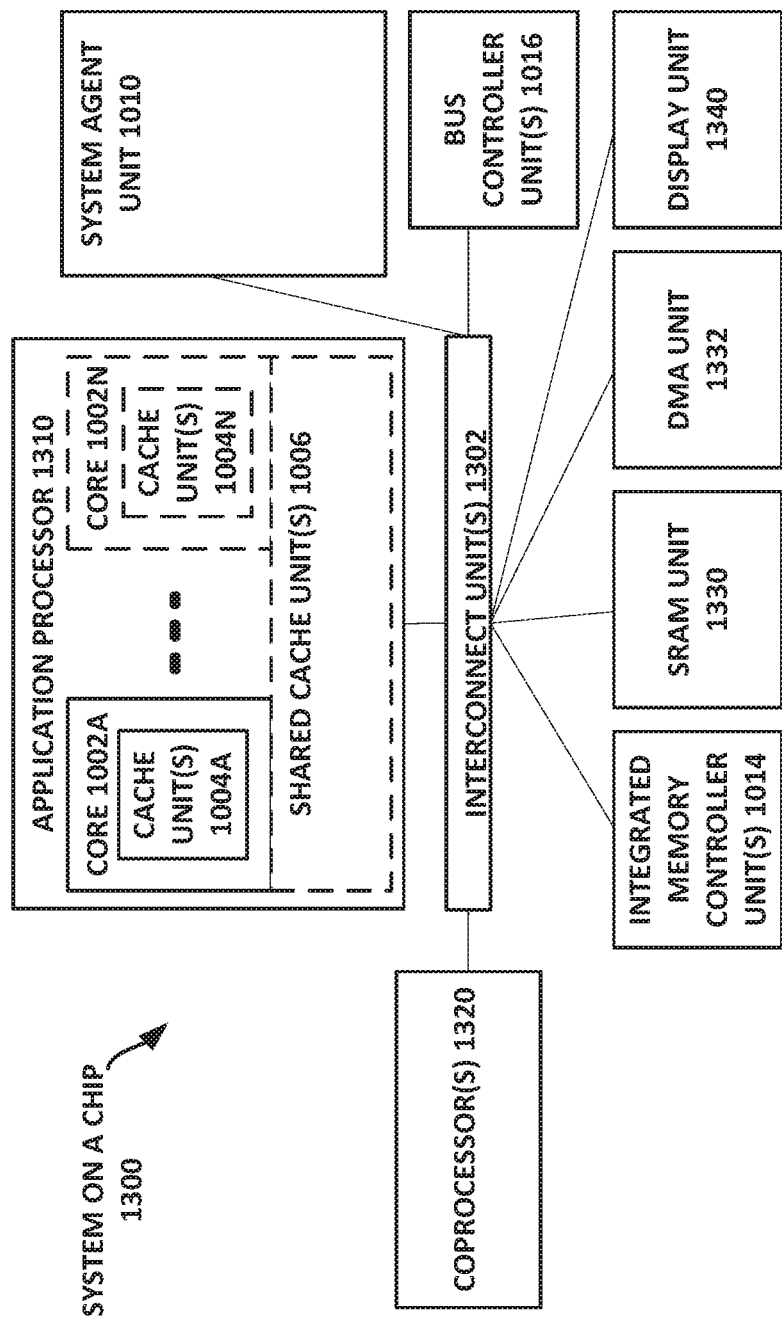
FIG. 13 depicts a block diagram of a SoC in accordance with an embodiment of the present disclosure.

FIG. 13 depicts a block diagram of a SoC 1300 in accordance with an embodiment of the present disclosure. Also, dashed lined boxes are optional features on more advanced SoCs. In FIG. 13, an interconnect unit(s) 1302 is coupled to: an application processor 1608 which includes a set of one or more cores 902A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1610; a direct memory access (DMA) unit 1332; and a display unit 1626 for coupling to one or more external displays. In one embodiment, the coprocessor(s) 1320 include a special-purpose processor, such as, for example, a network or communication processor, compression and/or decompression engine, GPGPU, a high-throughput MIC processor, embedded processor, or the like.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
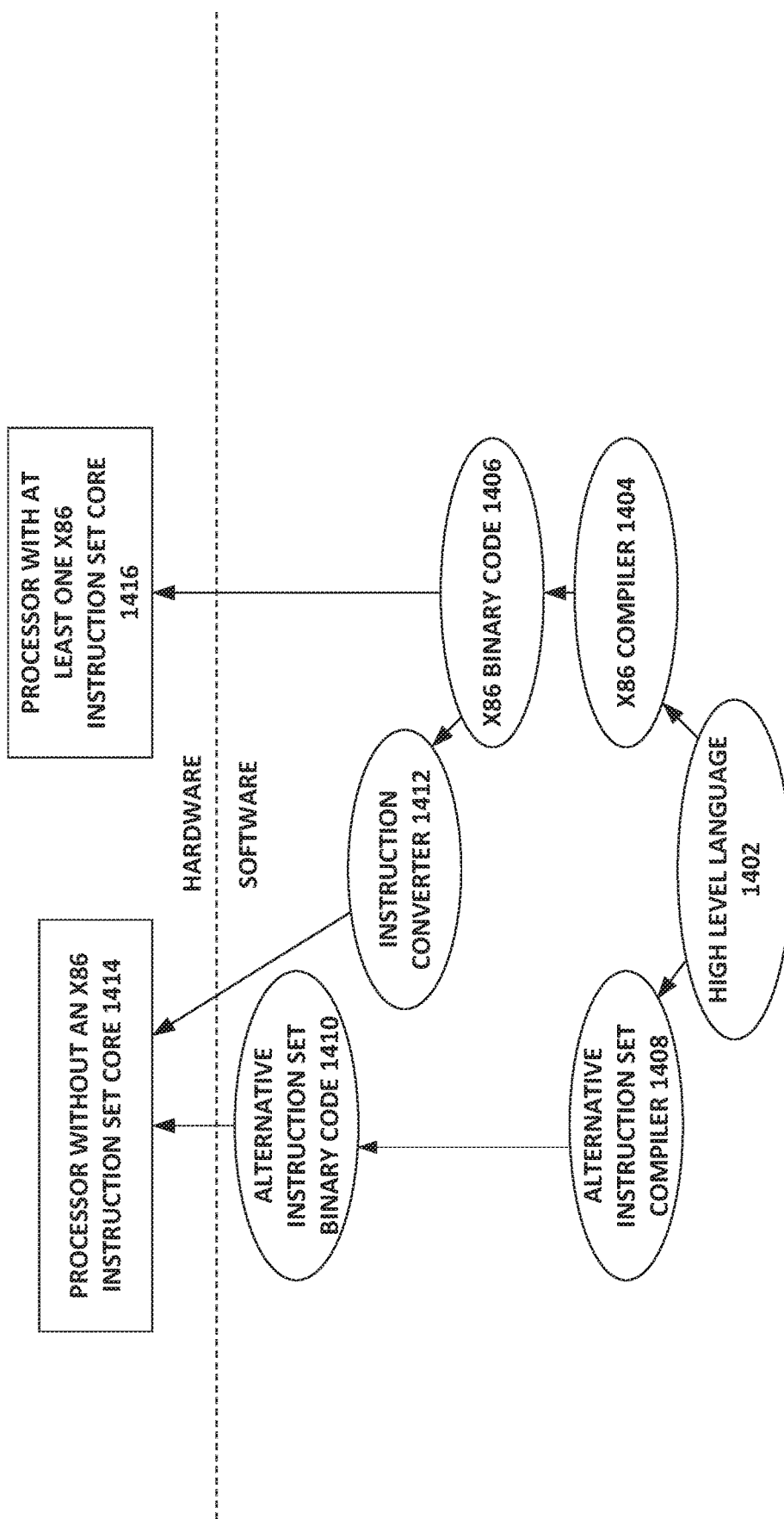
FIG. 14 is a block diagram contrasting the use of a software instruction converter to convert binary instructions in a source instruction set to binary instructions in a target instruction set according to embodiments of the disclosure.

FIG. 14 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible) by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Logic may be used to implement any of the functionality of the various components. "Logic" may refer to hardware, firmware, software and/or combinations of each to perform one or more functions. As an example, logic may include hardware, such as a micro-controller or processor, associated with a non-transitory medium to store code adapted to be executed by the micro-controller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the microcontroller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The systems, methods, computer program products, and apparatuses can include one or a combination of the following examples:

Example 1 may include a computer device, comprising a memory device; a cache device; and a link layer component coupled to the memory device and the cache device, the link layer component to identify first data received from the memory device, the first data of a first protocol format; identify second data received from the cache device, the second data of a second protocol format; and generate a flow control unit (flit) for transmission based on the first data and the second data, wherein the flit has a size of 528 bits.

Example 2 may include the computer device of example 1, wherein to generate the flit includes to multiplex a portion of the first data and a portion of the second data to generate the flit.

Example 3 may include the computer device of example 1, wherein the flit includes 512 bits for payload and 16 bits for cyclic redundancy checking.

Example 4 may include the computer device of example 3, wherein the 512 bits consist of a portion of the first data and a portion of the second data.

Example 5 may include the computer device of example 1, wherein the flit is divided into equally-sized slots, and wherein a first slot of the flit contains header information.

Example 6 may include the computer device of example 1, wherein the link layer component includes a transmitter link layer and a receiver link layer, and wherein the transmitter link layer maintains a rollover and the receiver link layer maintains a shadow rollover corresponding to the rollover.

Example 7 may include the computer device of example 6, wherein the flit comprises an all data flit, wherein the transmitter link layer transmits the flit, and wherein the receiver link layer determines when to expect an all data response flit based on transmission of the flit by the transmitter link layer and the shadow rollover.

Example 8 may include the computer device of example 1, wherein the flit comprises an all data flit.

Example 9 may include the computer device of example 1, wherein the flit is a first flit, wherein the first flit includes a first portion of the first data and a first portion of the second data, wherein the link layer component is further to generate a second flit that includes a second portion of the first data and a second portion of the second data, wherein the first flit includes a header associated with the first flit and the second flit, wherein the second flit comprises an all data flit, and wherein the second flit is to be transmitted subsequent to the first flit.

Example 10 may include the computer device of example 1, wherein the link layer component comprises flit-packer circuitry.

Example 11 may include the computer device of example 1, wherein the link layer component comprises a bridge or a switch.

Example 12 may include a method, comprising identifying, by a link layer, first data received in a first protocol format; identifying, by the link layer, second data received in a second protocol format; multiplexing, by the link layer, a portion of the first data and a portion of the second data to produce multiplexed data; and generating, by the link layer, a flow control unit (flit) that includes the multiplexed data.

Example 13 may include the method of example 12, wherein the flit has a size of 528 bits.

Example 14 may include the method of example 12, wherein the flit includes 512 bits for payload and 16 bits for cyclic redundancy check, and wherein the payload includes the multiplexed data.

Example 15 may include the method of example 14, wherein the payload consists of the multiplexed data.

Example 16 may include the method of example 12, wherein the flit is divided into equally-sized slots, and wherein a first slot of the flit contains header information.

Example 17 may include the method of example 12, further comprising maintaining, by a transmitter link layer of the link layer, a rollover; and maintaining, by a receiver link layer of the link layer, a shadow rollover that corresponds to the rollover.

Example 18 may include the method of example 17, further comprising transmitting, by the transmitter link layer, the flit, wherein the flit comprises an all data flit; and determining, by the receiver link layer, when to expect an all data response flit based on transmission of the flit by the transmitter link layer and the shadow rollover.

Example 19 may include the method of example 12, wherein the flit comprises an all data flit.

Example 20 may include the method of example 12, wherein the portion of the first data is a first portion of the first data, wherein the portion of the second data is a first portion of the second data, wherein the multiplexed data is first multiplexed data, wherein the flit is a first flit, and wherein the method further comprises multiplexing, by the link layer, a second portion of the first data and a second portion of the second data to produce second multiplexed data; generating, by the link layer, a second flit that includes the second multiplexed data, wherein the second flit comprises an all data flit, and wherein the first flit includes header information associated with the first flit and the second flit; transmitting, by the link layer, the first flit; and transmitting, by the link layer, the second flit subsequent to the first flit.

Example 21 is a system comprising a transmitter device comprising a memory for storing data, a cache for caching data, link layer logic implemented at least partially in hardware, and multiplexer logic implemented at least partially in hardware; and a receiver device comprising a decoder device to decode data packages received form the transmitter. The link layer logic is to identify, by a link layer device, first data received from the memory in a first protocol format; identify, by the link layer device, second data received from the cache in a second protocol format; multiplex, by the link layer device, a portion of the first data and a portion of the second data to produce multiplexed data; and generate, by the link layer device, a flow control unit (flit) that includes the multiplexed data.

Example 22 may include the subject matter of example 21, wherein the flit has a size of 528 bits.

Example 23 may include the subject matter of example 21 or 22, wherein the flit includes 512 bits for payload and 16 bits for cyclic redundancy check, and wherein the payload includes the multiplexed data.

Example 24 may include the subject matter of example 23, wherein the payload consists of the multiplexed data.

Example 25 may include the subject matter of example 21, wherein the flit is divided into equally-sized slots, and wherein a first slot of the flit contains header information.

What is claimed is:

1. An apparatus comprising:
a port to couple to a device over a link, wherein the port is to support a plurality of different interconnect protocols, the port comprises link layer circuitry to implement the plurality of different interconnect protocols and multiplexer circuitry to support dynamic protocol multiplexing of the plurality of different interconnect protocols, wherein the plurality of different interconnect protocols comprise an input/output (I/O) protocol, a memory access protocol, and a cache coherency protocol, wherein the memory access protocol and the cache coherency protocol share a common link layer, wherein:
the link layer circuitry is to: generate a flit, wherein the flit comprises a plurality of slots and a cyclic redundancy check (CRC) for the flit, the plurality of slots comprise equally-sized slots, the plurality of slots comprise a header slot and a plurality of generic slots, and the header slot is to carry a header to comprise link-layer-specific information; and
the port is to send the flit to the device over the link.

2. The apparatus of claim 1, wherein one of the plurality of generic slots comprises a message based on the cache coherency protocol.

3. The apparatus of claim 2, wherein the link layer circuitry is further to generate an all-data flit, the all-data flit comprises a plurality of data slots, and each of the plurality of data slots is to carry payload data.

4. The apparatus of claim 3, wherein the all-data flit does not comprise a header slot.

5. The apparatus of claim 2, wherein the first slot in the plurality of slots comprises the header slot.

6. The apparatus of claim 1, wherein the flit has a format to be used in both the memory access protocol and the cache coherency protocol.

7. The apparatus of claim 1, wherein the flit has a size of 528 bits.

8. The apparatus of claim 7, wherein the plurality of slots comprises four 16-byte slots.

9. The apparatus of claim 7, wherein the CRC comprises a 16-bit CRC.

10. The apparatus of claim 1, wherein a particular one of the plurality of slots comprises data of the memory access protocol and another one of the plurality of slots comprises data of the cache coherency protocol.

11. The apparatus of claim 1, wherein the CRC is outside the plurality of slots in the flit.

12. The apparatus of claim 1, wherein at least one of the plurality of different interconnect protocols is based on a Peripheral Component Interconnect Express (PCIe) protocol.

13. A method comprising:
generating a flow control unit (flit) at a first device, wherein the flit comprises a plurality of slots and a cyclic redundancy check (CRC) code for the flit, the plurality of slots comprise equally-sized slots, the plurality of slots comprise a header slot and a plurality of generic slots, and the header slot is to carry a header to comprise link-layer-specific information;
multiplexing data of a plurality of different protocols, wherein a port of the first device supports communication of data according to each of the plurality of different protocols, wherein the plurality of different interconnect protocols comprise an input/output (I/O) protocol, a memory access protocol, and a cache coherency protocol, wherein the memory access protocol and the cache coherency protocol share a common link layer; and
sending the flit on a link to a second device, wherein the flit comprises information for two or more of the plurality of different protocols based on the multiplexing, and the link couples the first device to the second device, and the link comprises a plurality of physical lanes.

14. The method of claim 13, wherein one of the plurality of generic slots comprises a message based on the cache coherency protocol.

15. The method of claim 13, wherein the flit comprises further comprising:
generating an all-data flit, wherein each slot of the all-data flit comprises a respective equally-sized data slot to carry payload data; and
sending the all-data flit on the link.

16. The method of claim 13, wherein the flit is generated using link layer logic of the first device.

17. A system comprising:
a host device; and
an endpoint device coupled to the host device by a link, wherein the host device comprises:
multiplexer circuitry to support dynamical protocol multiplexing of a plurality of different interconnect protocols for use on the link;
protocol circuitry comprising link layer circuitry to implement a link layer of each one of the plurality of interconnect protocols, wherein the protocol circuitry is to:
generate a flit, wherein the flit comprises a plurality of slots and a cyclic redundancy check (CRC) value for the flit, the plurality of slots comprise equally-sized slots, the plurality of slots comprise a header slot and a plurality of generic slots, and the header slot is to carry a header to comprise link-layer-specific information; and
cause the flit to be sent to the endpoint device over the link,
wherein the plurality of different interconnect protocols comprise an input/output (I/O) protocol, a memory access protocol, and a coherency protocol, wherein the memory access protocol and the cache coherency protocol share a common link layer.

18. The system of claim 17, wherein the input/output (I/O) protocol, the memory access protocol, and the coherency protocol comprise sub-protocols of an accelerator link protocol and the host device comprises a port to support both the accelerator link protocol and a Peripheral Component Interconnect Express (PCIe)-based protocol.

19. The system of claim 17, wherein one of the plurality of generic slots comprises a message based on the cache coherency protocol.

20. The system of claim 17, wherein the protocol circuitry is further to generate an all-data flit and cause the all-data flit to be sent to the endpoint device over the link, wherein each of the plurality of slots comprises a respective data slot to carry payload data.

21. The system of claim 17, wherein the endpoint device comprises an accelerator device.

22. The system of claim 17, wherein the endpoint device comprises a memory device.

* * * * *